(12) United States Patent
Nishimura et al.

(10) Patent No.: US 11,787,478 B2
(45) Date of Patent: Oct. 17, 2023

(54) AUTOMOBILE INNER PANEL AND AUTOMOBILE PANEL

(71) Applicant: NIPPON STEEL CORPORATION, Tokyo (JP)

(72) Inventors: Ryuichi Nishimura, Tokyo (JP); Koichi Hamada, Tokyo (JP); Atsuo Koga, Tokyo (JP); Takeshi Kawachi, Tokyo (JP); Yasunori Sawa, Tokyo (JP); Tohru Yoshida, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 194 days.

(21) Appl. No.: 17/422,129

(22) PCT Filed: Dec. 27, 2019

(86) PCT No.: PCT/JP2019/051435
§ 371 (c)(1),
(2) Date: Jul. 9, 2021

(87) PCT Pub. No.: WO2020/145198
PCT Pub. Date: Jul. 16, 2020

(65) Prior Publication Data
US 2022/0126926 A1 Apr. 28, 2022

(30) Foreign Application Priority Data

Jan. 10, 2019 (JP) .................. 2019-002993
Jan. 10, 2019 (JP) .................. 2019-002994
(Continued)

(51) Int. Cl.
*B62D 25/12* (2006.01)
*B60R 21/34* (2011.01)
(Continued)

(52) U.S. Cl.
CPC ........ *B62D 25/12* (2013.01); *B60R 2021/343* (2013.01)

(58) Field of Classification Search
CPC ...... B62D 25/10; B62D 25/105; B62D 25/12; B60R 21/34; B60R 2021/343
See application file for complete search history.

(56) References Cited

U.S. PATENT DOCUMENTS 9,783,236 B1 * 10/2017 Rivera ................ B62D 25/105
2004/0182616 A1 9/2004 Mason
(Continued)

FOREIGN PATENT DOCUMENTS

JP H11348716 A 12/1999
JP 2005-193863 A 7/2005
(Continued)

*Primary Examiner* — Gregory A Blankenship
(74) *Attorney, Agent, or Firm* — Birch, Stewart, Kolasch & Birch, LLP

(57) ABSTRACT

In an automobile inner panel and an automobile panel that includes the automobile inner panel, panel rigidity of the panel is secured while achieving a weight reduction. An automobile inner panel 2 has a plurality of sub-units 10 that each include a flange 11, an inclined wall 12 continuous with the flange 11, and a bottom portion 13 continuous with inclined wall 12 and separated from the flange 11. The bottom portions 13 and 13 of the sub-units 10 and 10 which are adjacent to each other are butted against each other and are directly continuous with each other. A maximum value of a distance D1 between two of the flanges 11 and 11 of two of the sub-units 10 and 10 in which the bottom portions 13 are arranged separated from each other and which are adjacent to each other is 250 mm or less.

18 Claims, 15 Drawing Sheets

(30) Foreign Application Priority Data

Jan. 10, 2019 (JP) .................................. 2019-002995
Aug. 6, 2019 (JP) .................................. 2019-144365

(56) References Cited

U.S. PATENT DOCUMENTS

| | | | | |
|---|---|---|---|---|
| 2005/0280287 | A1* | 12/2005 | Koura | B62D 25/105 296/193.11 |
| 2010/0019540 | A1* | 1/2010 | Fujimoto | B60R 21/34 296/193.11 |
| 2010/0194148 | A1* | 8/2010 | Fukumoto | B62D 25/105 296/193.11 |
| 2010/0314907 | A1* | 12/2010 | Iwano | B62D 25/105 296/187.09 |
| 2013/0108885 | A1* | 5/2013 | Takahashi | B60J 5/045 428/595 |
| 2013/0288015 | A1* | 10/2013 | Takahashi | B21D 47/00 428/180 |
| 2013/0295406 | A1* | 11/2013 | Takahashi | B62D 25/00 428/604 |
| 2014/0015285 | A1 | 1/2014 | Ishitobi et al. | |
| 2014/0110971 | A1* | 4/2014 | Ray | B62D 25/105 296/187.09 |
| 2015/0307135 | A1* | 10/2015 | Lindmark | B62D 25/105 296/191 |
| 2016/0107606 | A1* | 4/2016 | Mildner | B62D 25/12 296/193.11 |
| 2017/0158163 | A1* | 6/2017 | Yoshida | B62D 25/12 |
| 2017/0282978 | A1* | 10/2017 | Yoshida | B62D 25/105 |
| 2018/0072262 | A1* | 3/2018 | Nakasako | B60R 21/34 |
| 2019/0315305 | A1* | 10/2019 | Hammer | B62D 25/12 |
| 2021/0061367 | A1* | 3/2021 | Hahnlen | B21D 22/02 |
| 2022/0097773 | A1* | 3/2022 | Yoshida | B62D 29/008 |
| 2022/0097774 | A1* | 3/2022 | Yoshida | B60R 21/34 |
| 2022/0126926 | A1* | 4/2022 | Nishimura | B62D 29/008 |
| 2022/0274150 | A1* | 9/2022 | Yamazaki | B21D 22/26 |
| 2023/0112540 | A1* | 4/2023 | Nishimura | B62D 25/105 296/187.04 |

FOREIGN PATENT DOCUMENTS

| | | |
|---|---|---|
| JP | 2006-224876 A | 8/2006 |
| JP | 3982061 B2 | 9/2007 |
| JP | 4763417 B2 | 8/2011 |
| JP | 2012-210909 A | 11/2012 |
| JP | 2017-1553 A | 1/2017 |
| KR | 0135009 Y | 1/1999 |

* cited by examiner

FIRST MODIFICATION OF ARRANGEMENT OF JOINTS

SECOND MODIFICATION OF ARRANGEMENT OF JOINTS

OVERSIZED FRAME-TYPE STRUCTURE

UNDERSIZED FRAME-TYPE STRUCTURE

ENLARGED VIEW OF UNDERSIZED FRAME-TYPE STRUCTURE

HONEYCOMB STRUCTURE

QUADRANGULAR STRUCTURE

AUTOMOBILE PANEL

AUTOMOBILE PANEL

ABOMOBILE INNER PANEL AND AUTOMOBILE PANEL

TECHNICAL FIELD

The present invention relates to an automobile inner panel and an automobile panel.

BACKGROUND ART

An automobile hood as an automobile panel is known (for example, see Patent Documents 1 and 2).

Patent Document 1 discloses a hood panel for a vehicle. The principle purpose of the hood panel is to reduce the degree of injury to a pedestrian if the pedestrian collides with the hood panel.

Patent Document 2 discloses a hood for an automobile as exterior equipment for an automobile. The principle purpose of the hood for an automobile is to absorb the energy of contact when a pedestrian comes into contact with the hood for an automobile, by only deforming by a small amount in the inward direction of the automobile.

LIST OF PRIOR ART DOCUMENTS

Patent Document

Patent Document 1: JP2005-193863A
Patent Document 2: JP2017-1553A

SUMMARY OF INVENTION

Technical Problem

There is a demand for the weight of automobile hoods to be reduced further and for the panel rigidity of automobile hoods to be improved. However, for example, in a case where an automobile hood is composed of a steel sheet, if the outer panel of the automobile hood is thinned to reduce the weight, the panel rigidity of the automobile hood will decrease to an extent that cannot be ignored.

Patent Document 1 and Patent Document 2 do not disclose any matters regarding problems or structures from the viewpoint of securing panel rigidity while achieving a weight reduction. The demand to secure panel rigidity while achieving a weight reduction exists with respect to automobile panels at places other than the automobile hood also.

One objective of the present invention is, with respect to an automobile inner panel and to an automobile panel that includes the automobile inner panel, to secure the panel rigidity of the automobile panel while achieving a weight reduction.

Solution to Problem

The gist of the present invention is an automobile inner panel and an automobile panel including the automobile inner panel which are described hereunder.

(1) An automobile inner panel, including:
a plurality of sub-units each including a flange, an inclined wall continuous with the flange, and a bottom portion continuous with the inclined wall and separated from the flange,
wherein:
the bottom portions of the sub-units which are adjacent to each other are butted against each other and are directly continuous with each other; and
a maximum value of a distance between two of the flanges of two of the sub-units in which the bottom portions are arranged separated from each other and which are adjacent to each other is 250 mm or less.

(2) An automobile inner panel, including:
a plurality of sub-units each including a flange, an inclined wall continuous with the flange, and a bottom portion continuous with the inclined wall and separated from the flange,
wherein:
a frame portion having a hat-shaped cross section is formed by a pair of the sub-units including a pair of the bottom portions which are butted against each other and are directly continuous with each other;
a plurality of the frame portions are provided; and
a maximum value of a distance between the flanges of two of the frame portions which are arranged separated from each other and are adjacent is 250 mm or less.

(3) The automobile inner panel according to the above (1) or the above (2), wherein:
a unit having a polygonal shape is formed by a plurality of the sub-units.

(4) The automobile inner panel according to any one of the above (1) to the above (3), wherein:
a unit having a round shape or an oval shape is formed by the sub-unit.

(5) The automobile inner panel according to the above (3) or the above (4), wherein:
a plurality of the flanges in a plurality of the units are disposed in a close-packed arrangement.

(6) The automobile inner panel according to any one of the above (1) to the above (5), wherein:
the sub-unit having a height from the bottom portion to the flange of 10 mm or more is provided.

(7) The automobile inner panel according to any one of the above (1) to the above (6), wherein:
at least at one part of an outermost circumferential sub-unit, which is the sub-unit arranged adjacent to an outer circumferential edge of the automobile inner panel, a height from the bottom portion to the flange is lower than a height from the bottom portion to the flange in another sub-unit.

(8) An automobile panel, including:
an automobile inner panel according to any one of the above (1) to the above (7);
an automobile outer panel supported by the automobile inner panel; and
a joint,
wherein:
the joint is provided in at least one of a plurality of the flanges of the automobile inner panel; and
the joint joins the flange in which the joint is provided and the automobile outer panel.

(9) The automobile panel according to the above (8), wherein:
a frame portion having a hat-shaped cross section is formed by a pair of the sub-units including a pair of the bottom portions which are butted against each other and are directly continuous with each other;
a plurality of the frame portions are provided;
the joints are provided in two of the frame portions which are arranged separated from each other and are adjacent; and
a minimum value of a distance between the joints of two of the frame portions is 30 mm or more.

(10) The automobile panel according to the above (8) or the above (9), wherein:
the outer panel is a steel sheet; and
a sheet thickness of the outer panel is within a range of 0.35 mm to 0.60 mm.

(11) The automobile panel according to the above (8) or the above (9), wherein:
the outer panel is an aluminum alloy sheet; and
a sheet thickness of the panel is within a range of 0.50 mm to 1.00 mm.

Advantageous Effects of Invention

According to the present invention, the panel rigidity of an automobile panel can be secured while achieving a reduction in the weight of the automobile panel.

DESCRIPTION OF EMBODIMENTS

Figure 1:
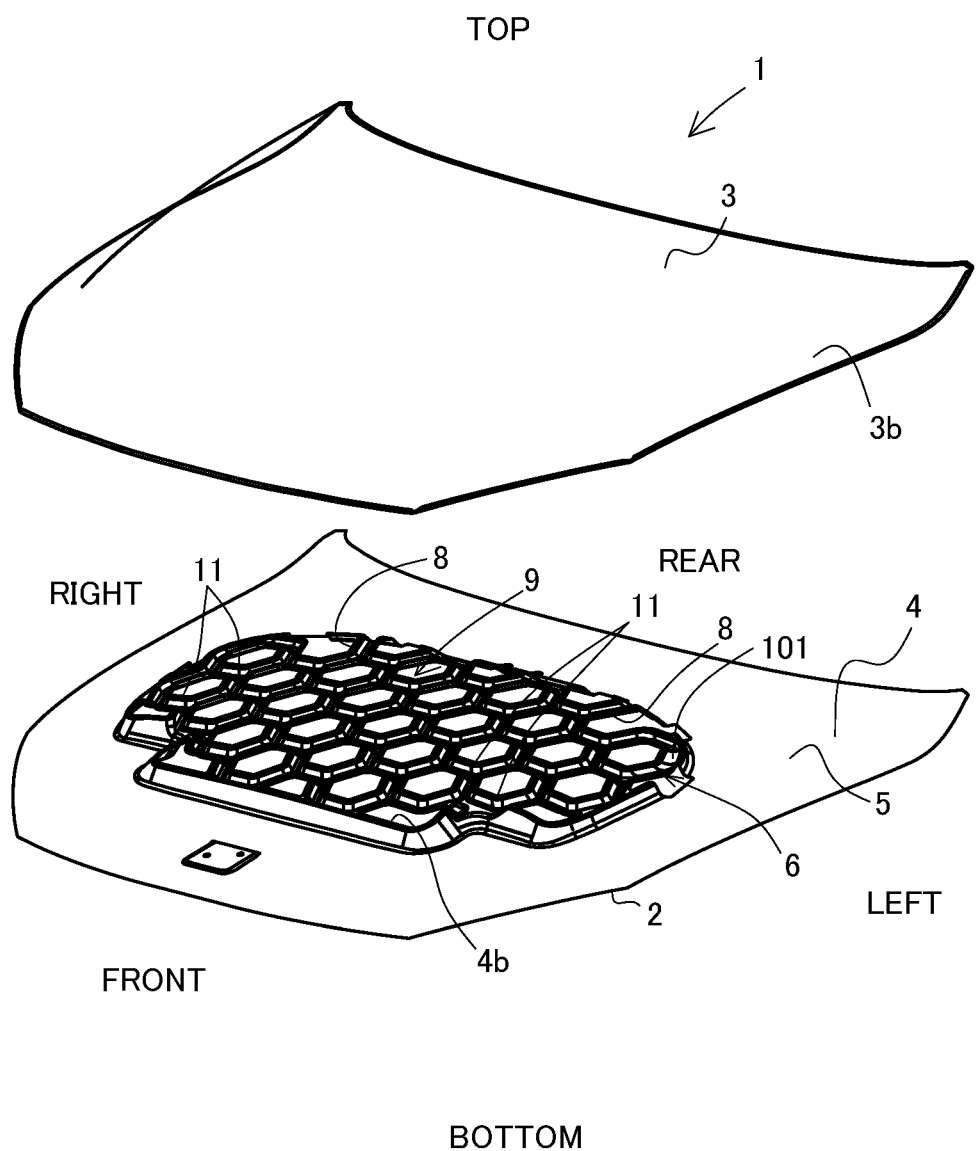
FIG. 1 is a schematic exploded perspective view of an automobile panel according to one embodiment of the present invention.

Hereunder, first, the circumstances leading to the conception of the present invention will be described, and then embodiments will be described in detail.

CIRCUMSTANCES LEADING TO CONCEPTION OF PRESENT INVENTION

In the present description, the term "panel rigidity" refers to, in a case where a force from outside acts on a press-formed product, for example, an outer panel of an automobile hood which has a comparatively moderately curving surface and in which the surface area is extremely large relative to the sheet thickness, the rigidity of an outer panel. The panel rigidity is an index representing the degree of inflexibility of the outer panel. For example, if the panel rigidity is high, the outer panel is difficult to deflect when a hand is placed on the outer panel. The panel rigidity corresponds to a feeling of elastic resistance or a sensation of deflection deformation when the outer panel is pressed with a hand. This characteristic is usually represented by the deflection when a load is applied, and the smaller the deflection is when a constant load is applied, the higher the panel rigidity is.

In the present description, dent resistance is an index of the difficulty of producing permanent strain which remains after the relevant part is strongly pressed (an index representing the difficulty of forming a dent flaw). For example, when an outer panel is pressed down strongly, a dent flaw will easily be formed if the dent resistance is low. Further, if the dent resistance is low, when the outer panel is hit with a pebble or the like, a dent flaw will be easily formed. The term "dent resistance" refers to the difficulty for an indentation (dent) to be left after removing the load in a case where a localized load is applied to the outer panel for some reason. In the case of the body of an actual automobile, such dents occur when an outer panel of a door or the like is strongly pressed with a finger or the palm of a hand, or when the automobile body is hit by a flying stone while travelling and the like. A dent is formed as a result of a place on the outer panel at which a load has been applied plastically deforming. Therefore, when the strain on the outer panel at a time that a load is applied thereto reaches a certain magnitude, the strain remains even after the load is removed, and a dent occurs. The minimum value of a load that causes a certain residual strain in the outer panel is referred to as the "dent load", and the larger the dent load is, the better the dent resistance is.

In an automobile panel, the thinner the sheet thickness of the panel is made, the greater the degree to which both the panel rigidity and the dent resistance decrease. Further, with regard to automobile panels, it cannot be said that conventionally improvements have been made mainly from the viewpoint of securing panel rigidity while achieving a weight reduction. Furthermore, it cannot be said that improvements have been made mainly from the viewpoint of securing both panel rigidity and dent resistance.

In recent years, in order to reduce the weight of automobiles, the strength of the members constituting the automobiles has been increased. In general, if the strength (tensile strength) of a member is increased, the walls of the member can be made thinner. It is considered that, as a result, the weight of the member can be reduced. However, such kind of wall thinning has not necessarily been proceeding with respect to outer panels such as the outer panel of an automobile hood. The principal reasons why wall thinning of outer panels has not been proceeding are that (i) the panel rigidity required for an outer panel is reduced as the result of increasing the strength and thinning the walls of the outer panel, and (ii) it is also difficult to suppress a reduction in dent resistance caused by wall thinning.

The phenomenon of dent resistance is complicated, and it is not easy to predict. For example, it is said that dent resistance is affected by the ultimate yield stress (yield stress of an outer panel when it becomes a part of an automobile body after undergoing a press working process and a paint baking process), sheet thickness, shape, rigidity and the like relating to the outer panel. Further, with respect to dent resistance, a prediction formula that considers factors in all of these influencing factors not been established.

Therefore, the present situation is that in some cases dent resistance is estimated based on a simple prediction formula that is obtained by a very simple experiment. The experiment is, for example, a dent resistance test using a panel of about 400 mm square. Further, for example, if the sheet thickness of the steel panel is 0.4 mm, it is difficult to satisfy a dent resistance equivalent to that of current outer panels, even with a high tensile strength steel sheet of 590 MPa-class.

The essential point about the aforementioned prediction formula is what power of the sheet thickness the dent resistance is proportional to. In the aforementioned simple prediction formula, the dent resistance is considered to be proportional to about the square or more (power of around 2 to 3) of the sheet thickness of the outer panel or more. Assuming that the dent resistance is proportional to the power of 2 to 3 of the sheet thickness, the calculation result will be that it is not possible to make the walls thinner by increasing the tensile strength beyond the current level.

While obtaining the above findings, the inventors of the present application conducted intensive studies with respect to methods for suppressing a decrease in panel rigidity and also a decrease in dent resistance which are caused by thinning the walls of an outer panel. As a result, the inventors of the present application established the structure of the present invention, that is, a structure that secures the panel rigidity of an outer panel by devising a suitable design for the inner panel.

DESCRIPTION OF EMBODIMENT

Hereunder, an embodiment of the present invention is described while referring to the accompanying drawings. The present embodiment will be described taking the case of an automobile hood as one example of an automobile panel. Note that, the automobile panel of the present invention is not limited to an automobile hood, and can be exemplified by an automobile outer skin panel including an inner panel and an outer panel, for example, a quarter panel or a door panel (door inner panel, door outer panel).

Figure 2:
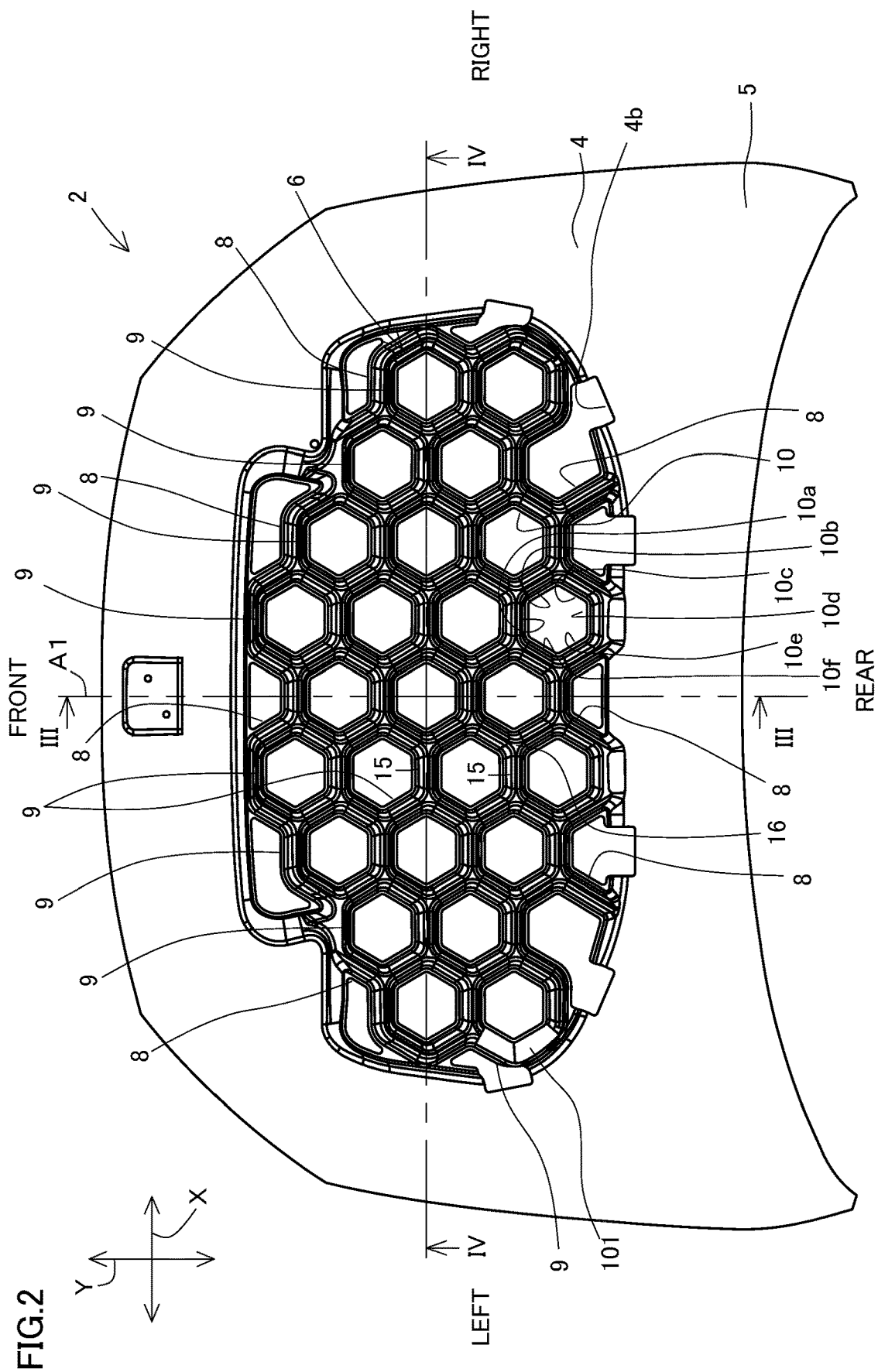
FIG. 2 is a plan view of an inner panel of the automobile panel.
Figure 3:
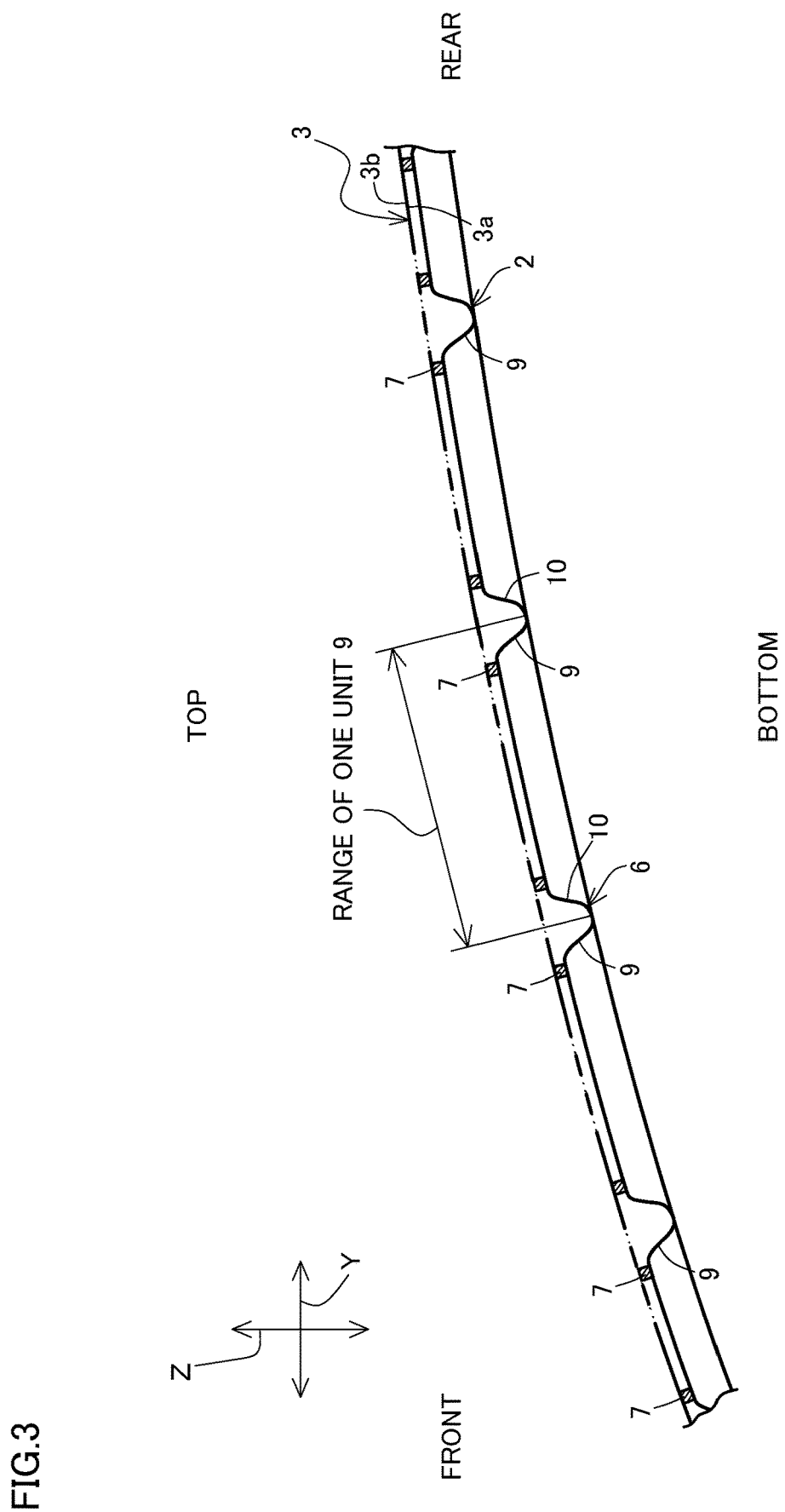
FIG. 3 is a schematic cross-sectional view along a line in FIG. 2.
Figure 4:
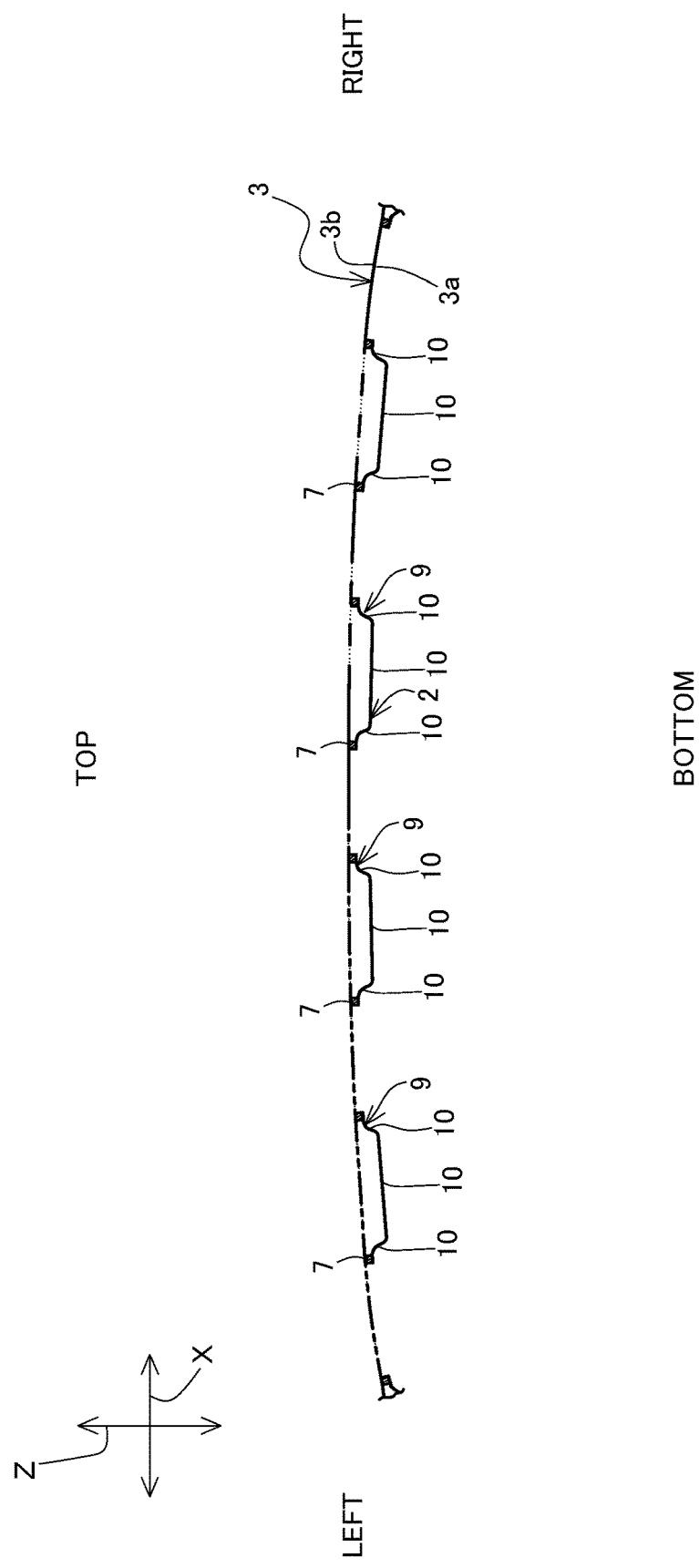
FIG. 4 is a cross-sectional view along a line IV-IV in FIG. 2, in which illustration of a portion that appears to the rear of the cross-section is omitted.

FIG. 1 is a schematic exploded perspective view of an automobile panel 1 according to one embodiment of the present invention. FIG. 2 is a plan view of an inner panel 2 of the automobile panel 1. FIG. 3 is a schematic cross-sectional view along a line in FIG. 2. FIG. 4 is a cross-sectional view along a line IV-IV in FIG. 2, in which illustration of a portion that appears to the rear of the cross-section is omitted. Note that, in FIG. 3 and FIG. 4, an outer panel 3 that does not appear in FIG. 2 is indicated by a chain double-dashed line that is a virtual line.

Figure 5:
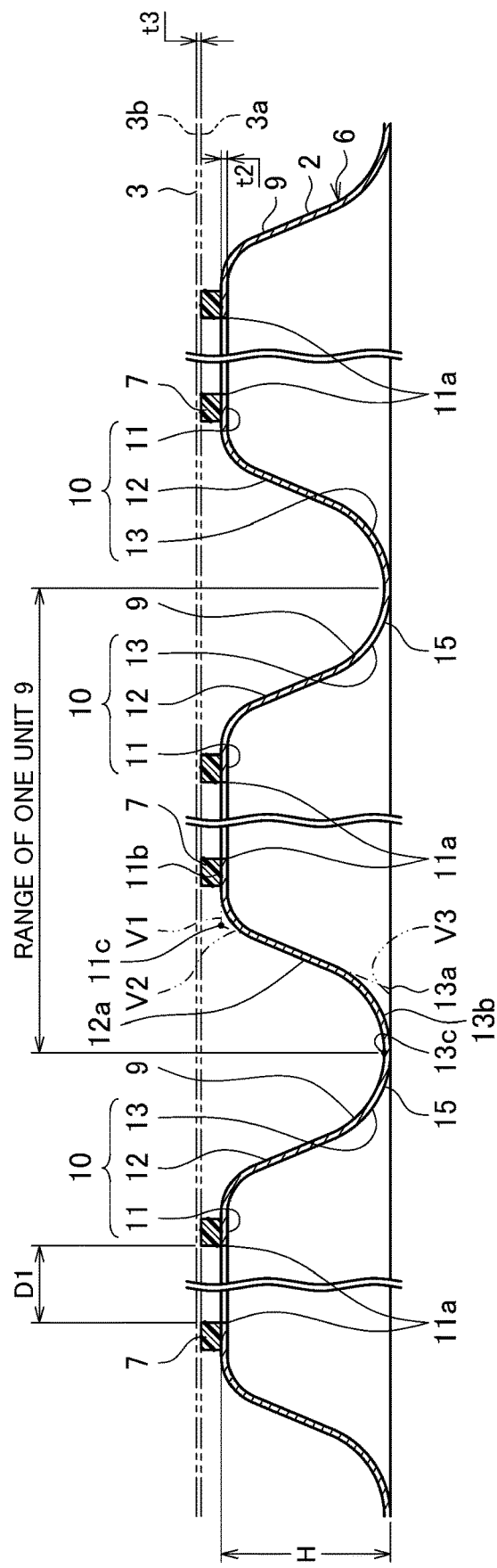
FIG. 5 is a view in which one part of FIG. 3 is enlarged.
Figure 6:
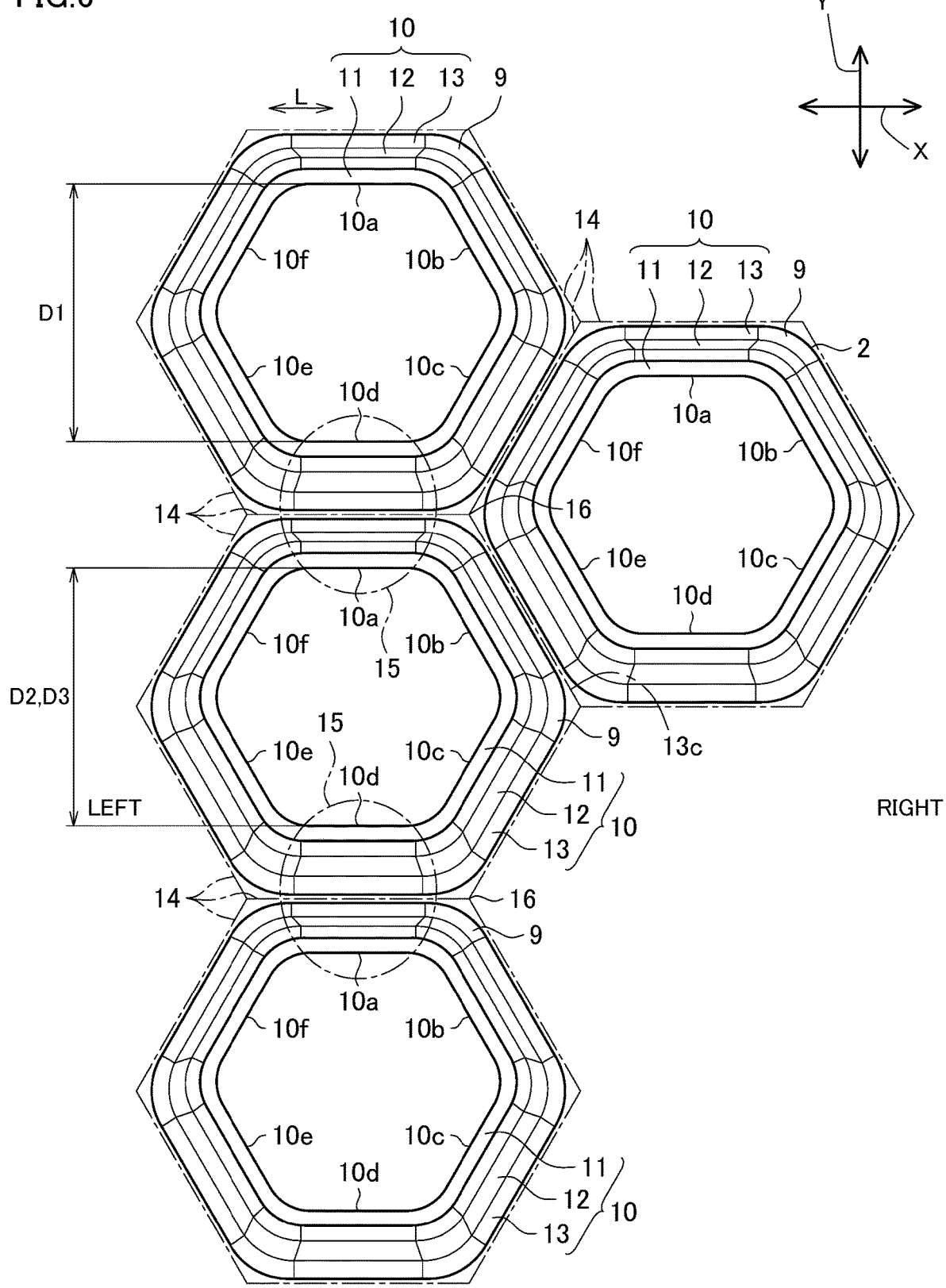
FIG. 6 is a plan view in which one part of the inner panel illustrated in FIG. 2 is enlarged.
Figure 7:
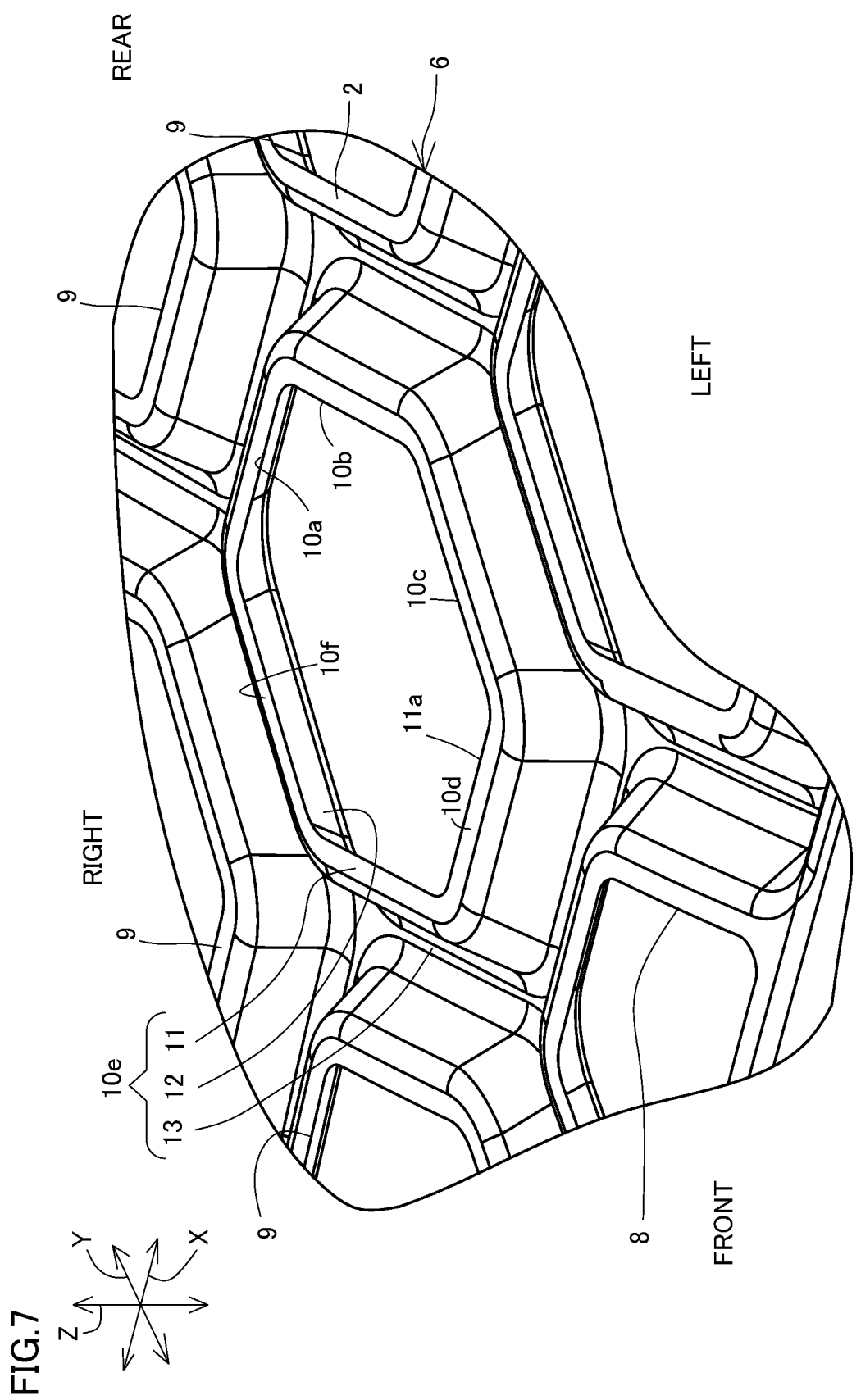
FIG. 7 is a perspective view in which the periphery of one unit of the inner panel is enlarged.
Figure 8:
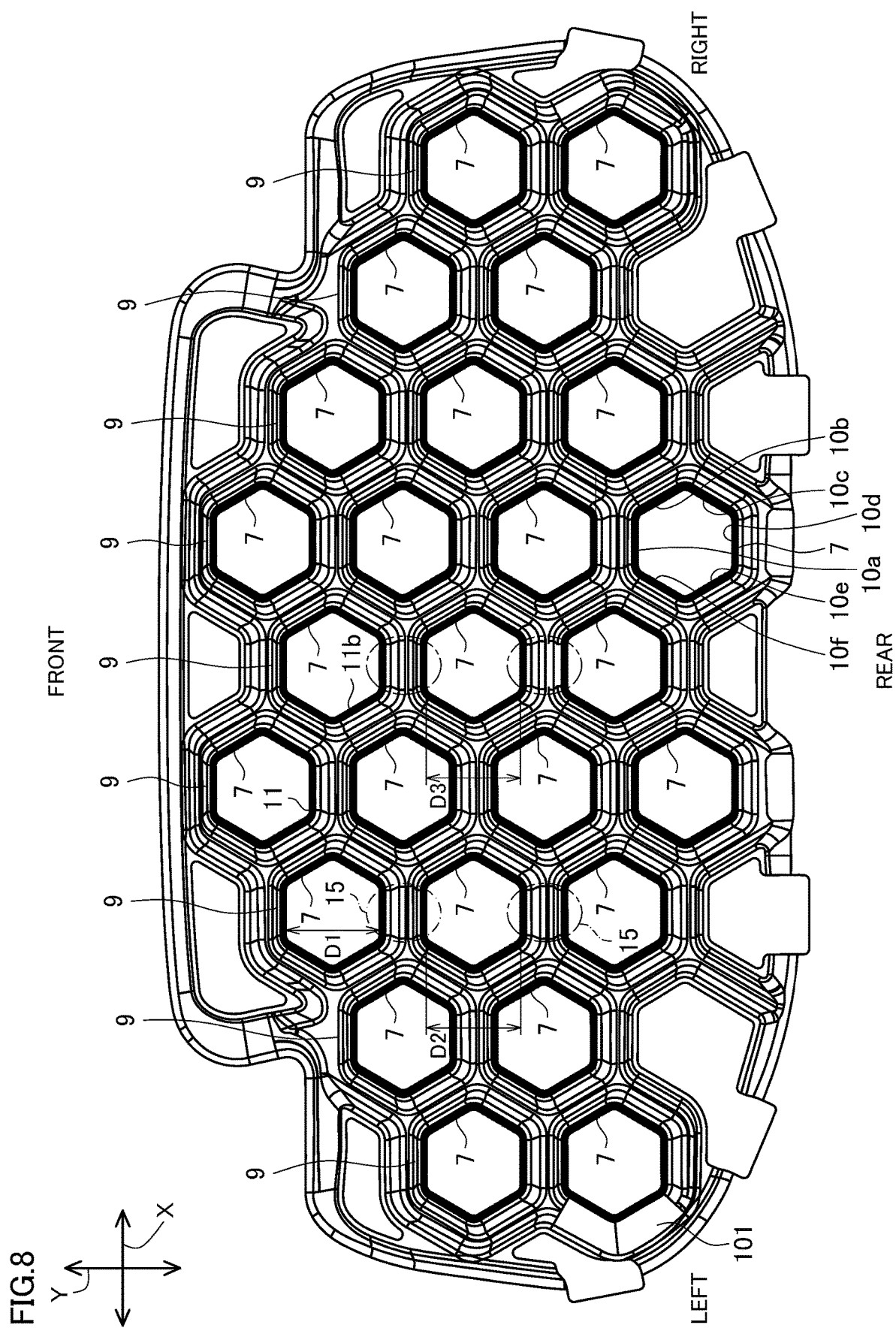
FIG. 8 is a view for describing one example of the arrangement of joints in the automobile panel.

FIG. 5 is view in which one part of FIG. 3 is enlarged. FIG. 6 is a plan view in which one part of the inner panel 2 is enlarged. FIG. 7 is a perspective view in which the periphery of one unit 9 of the inner panel 2 is enlarged. FIG. 8 is a view for describing one example of the arrangement of joints 7 in the automobile panel 1. Hereinafter, unless otherwise specified, the embodiment will be described with reference to FIG. 1 to FIG. 8 as appropriate.

The automobile panel 1 is a front hood provided at the front part of an automobile, and is also called a "bonnet". An automobile in which the automobile panel 1 is provided is, for example, a passenger vehicle. A sedan-type passenger vehicle, a coupe-type passenger vehicle, a hatchback-type passenger vehicle, a minivan-type passenger vehicle, an SUV (Sport Utility Vehicle) type passenger vehicle, and the like can be mentioned as examples of the passenger vehicle.

Note that, in the present description, the terms "front", "rear", "left", "right", and "upper" and "lower" are used taking a time when the automobile panel 1 is mounted to an automobile and the automobile panel 1 is closed as the basis. The term "front" refers to the direction in which the automobile advances. The term "rear" refers to the direction in which the automobile reverses. The term "right" refers to the turning direction of the automobile when the automobile which is advancing turns to the right. The term "left" refers to the turning direction of the automobile when the automobile which is advancing turns to the left. Further, in the present embodiment, the vehicle width direction of the automobile to which the automobile panel 1 is mounted is referred to as "width direction X". Further, the vehicle length direction of the automobile to which the automobile panel 1 is mounted is referred to as "longitudinal direction Y". Furthermore, the vehicle height direction of the automobile to which the automobile panel 1 is mounted is referred to as "height direction Z".

The automobile panel 1 has an automobile inner panel 2, an automobile outer panel 3 that is supported by the automobile inner panel 2, and a joint 7 that joins the automobile outer panel 3 and the inner panel 2. Note that, in the following, the automobile inner panel 2 is referred to simply as the inner panel 2, and the automobile outer panel 3 is referred to simply as the outer panel 3.

In the automobile panel 1, the outer panel 3 is a portion that constitutes a part of the outer surface of the automobile. The outer panel 3 is formed of, for example, a metal material such as a mild steel sheet or a high-tensile strength steel sheet. Examples of the high-tensile strength steel sheet that can be mentioned include steel sheets having a tensile strength of 340 MPa or more, for example, a steel sheet having a tensile strength of 590 MPa or more. Note that, the tensile strength of the high-tensile strength steel sheet may be within the range of 440 MPa to 590 MPa. The outer panel 3 is formed, for example, by subjecting a single steel sheet to press working or the like. A sheet thickness t3 of the outer panel 3 (thickness of the steel sheet) is set to 0.60 mm or less, preferably is set to 0.50 mm or less, and more preferably is set to 0.40 mm or less. The lower limit of the sheet thickness t3 of the outer panel 3 is preferably 0.35 mm. The sheet thickness t3 of the outer panel 3 is, for example, within the range of 0.35 mm to 0.60 mm. The thinner the sheet thickness t3 of the outer panel 3 is made in this way, the lighter the automobile panel 1 can be made.

The outer panel 3 may be an aluminum alloy sheet. In this case, the sheet thickness of the outer panel 3 is set so as to obtain equivalent values from the viewpoint of panel rigidity and dent resistance with respect to the sheet thickness of the outer panel 3 that is made of a steel sheet. More specifically, the panel rigidity depends on the Young's modulus of the material and the sheet thickness. Further, the dent resistance depends on the yield stress of the material and the sheet thickness. Hence, if the sheet thickness of the outer panel 3 made of an aluminum alloy sheet is approximately 1.5 to 1.6 times larger than the sheet thickness of the outer panel 3 made of a steel sheet, it can be said that the outer panel 3 that is made of an aluminum alloy and the outer panel 3 that is made of a steel sheet are equivalent from the viewpoint of panel rigidity and dent resistance.

In a case where the outer panel 3 is an aluminum alloy sheet, an aluminum alloy sheet having a tensile strength of 250 MPa or more, preferably, 300 MPa to 350 MPa, can be mentioned as an example thereof. The sheet thickness t3 of the outer panel 3 in this case (thickness of the aluminum alloy sheet) is set to 1.00 mm or less, preferably is set to 0.80 mm or less, and more preferably is set to 0.64 mm or less. The lower limit of the sheet thickness t3 of the outer panel 3 is preferably 0.50 mm. The sheet thickness t3 of the outer panel 3 is, for example, within the range of 0.50 mm to 1.00 mm.

There are no particular restrictions with regard to the shape of the outer panel 3. Note that, in the present embodiment, the outer panel 3 has a shape in which the central portion is upwardly convex in the height direction Z.

The inner panel 2 reinforces the outer panel 3 by being joined to an undersurface 3a of the outer panel 3. By this means, the inner panel 2 increases the panel rigidity of the outer panel 3. In addition, in the present embodiment, the inner panel 2 increases the dent resistance of the outer panel 3. That is, in the present embodiment, the tension rigidity and the dent resistance of the outer panel 3 are secured not by increasing the sheet thickness of the outer panel 3, but rather are secured by the shape of the inner panel 2. The inner panel 2 is formed, for example, of a metal material such as a steel sheet. The inner panel 2 is formed, for example, by subjecting a single steel sheet to press working. The inner panel 2 may be an integrally formed product, or may be formed by joining a plurality of members together. In the present embodiment, the inner panel 2 is an integrally formed product. A sheet thickness t2 of the inner panel 2 (thickness of the steel sheet) is preferably within the range of 0.3 mm to 0.8 mm. The upper limit of the sheet thickness t2 of the inner panel 2 is preferably 0.6 mm. The sheet thickness t2 of the inner panel 2 may be less than the sheet thickness t3 of the outer panel 3, may be the same as the sheet thickness t3 of the outer panel 3, or may be greater than the sheet thickness t3 of the outer panel 3.

The inner panel 2 may be an aluminum alloy sheet. In this case, the sheet thickness of the inner panel 2 is set to an equivalent value from the viewpoint of panel rigidity and dent resistance with respect to the sheet thickness of the inner panel 2 that is made of a steel sheet. Therefore, similarly to the case of the outer panel 3, if the sheet thickness of the inner panel 2 made of an aluminum alloy is approximately 1.5 to 1.6 times larger than the sheet thickness of the inner panel 2 made of a steel sheet, it can be said that the inner panel 2 made of an aluminum alloy and the inner panel 2 made of a steel sheet are equivalent from the viewpoint of panel rigidity and dent resistance. In a case where the inner panel 2 is made of an aluminum alloy, the sheet thickness t2 of the inner panel 2 (thickness of aluminum alloy sheet) is within the range of 0.4 mm to 1.3 mm. The upper limit of the sheet thickness t2 of the inner panel 2 is preferably 1.0 mm.

The inner panel 2 has an outer circumferential portion 4 in which a contour forming portion 5 is provided, and an overhanging structure 6 disposed so as to be surrounded by the contour forming portion 5.

The outer circumferential portion 4 is an outer circumferential part of the inner panel 2. When the outer panel 3 closes the engine room, the outer circumferential portion 4 of the inner panel 2 is received by the automobile body (not illustrated) together with the outer circumferential portion of the outer panel 3. By this means, a load that acts on an upper face 3b of the outer panel 3 is received by the automobile body through the inner panel 2.

The contour forming portion 5 of the outer circumferential portion 4 is a three-dimensionally shaped portion formed at the outer circumferential part of the inner panel 2, and is a portion at which the bending rigidity is enhanced among the entire outer circumferential portion 4 of the inner panel 2. In the present embodiment, the contour forming portion 5 is formed over the entire area in the circumferential direction of the outer circumferential portion of the inner panel 2. Note that, the contour forming portion 5 may be formed only at one part in the circumferential direction of the outer circumferential portion 4 of the inner panel 2. The contour forming portion 5 includes a portion that rises and falls in the height direction Z when moved in the horizontal direction over the inner panel 2. The specific shape of the contour forming portion 5 is not limited as long as the contour forming portion 5 has a shape that suppresses deflection deformation of the outer circumferential portion 4 in the downward direction when the outer circumferential portion 4 of the inner panel 2 receives a load which deflects the outer circumferential portion 4 downward due to a flat portion or the overhanging structure 6 of the inner panel 2 being lifted. The overhanging structure 6 is arranged so as to be surrounded by the contour forming portion 5.

The overhanging structure 6 has a three-dimensional structure which is provided in order to receive a load acting on the upper face 3b of the outer panel 3. The overhanging structure 6 has a configuration in which members that have a hat-shaped cross section (a V-shaped cross section or a U-shaped cross section) are combined.

The overhanging structure 6 has a plurality of incomplete units 8 that are adjacent to an inner circumferential edge portion 4b of the outer circumferential portion 4 and continuous with the outer circumferential portion 4, and a plurality of units 9.

The unit 9 which is adjacent to the outer circumferential portion 4 of the inner panel 2 is connected to the outer circumferential portion 4 directly or through the incomplete unit 8.

The incomplete unit 8 has a configuration equivalent to a configuration in which one portion of the unit 9 has been cut off along the circumferential direction of the polygonal (in the present embodiment, hexagonal) unit 9. The incomplete unit 8 has a side portion that is similar to a sub-unit 10 of the unit 9 that is described later. The side portion is continuous with the inner circumferential edge portion 4b of the outer circumferential portion 4.

Each unit 9 is formed in a polygonal (in the present embodiment, hexagonal) annular shape in plan view in the height direction Z. Hereinafter, when simply the term "plan view" is used, it means a plan view in the height direction Z. By forming each unit 9 in a small polygonal shape that is annular, the inner panel 2 can be made lightweight and the inner panel 2 can also be provided with high rigidity.

In the present embodiment, each unit 9 is formed in the shape of a substantially regular hexagon with rounded corners. The term "regular hexagon" means a hexagon in which the lengths of the respective sides are equal and the interior angles are also a constant angle of 120 degrees. Further, in the present description, the term "substantially regular hexagon" refers to a hexagon that can be treated as a regular hexagon from the viewpoint of the tension rigidity and the viewpoint of the dent resistance of the outer panel 3. The respective units 9 are formed so that the shape of each unit 9 is substantially the same. Note that, the term "substantially the same" in this case indicates that the configuration is the same except in the respect that the shape of each unit 9 is caused to match a shape which matches the curved shape of the outer panel 3.

Each unit 9 may also be formed in the shape of a hexagon that is other than a regular hexagon. Examples of a hexagon other than a regular hexagon that can be mentioned include a hexagon in which the lengths of the respective sides are not uniform, and a hexagon in which the interior angles are not uniform at 120 degrees. Examples of a hexagon in which the lengths of the respective sides are not uniform that can be mentioned include a hexagon in which the length of a front end side and the length of a rear end side are set to a predetermined first length, and which has four sides whose lengths are each set to a predetermined second length that is different from the first length.

The overhanging structure 6 has a structure in which a plurality of the units 9 having a hexagonal annular shape are disposed in a close-packed arrangement. In this case, the term "close-packed" means that a plurality of the units 9 that are adjacent to each other are arranged without a gap therebetween. Specifically, each unit 9 is partitioned off from the other units 9 by unit boundaries 14 that are described later. As illustrated in FIG. 5 and FIG. 6, a front end 13*c* (lower end) of a bottom portion 13 forms a boundary of the bottom portion 13 that includes the front end 13*c*, to thereby form the unit boundary 14. The unit boundary 14 is formed in a hexagonal shape in plan view. By having such a structure in which the units 9 are disposed in a close-packed hexagonal arrangement, the overhanging structure 6 can withstand loads in substantially the same manner from all directions including the height direction Z over the whole area in plan view.

In a case where flanges 11, described later, of the units 9 are disposed in a close-packed arrangement, preferably a plurality of the units 9 are the same shape. Further, the units 9 that have similar forms to each other or have different shapes with each other may be disposed in a close-packed arrangement. Note that, in the overhanging structure 6, the units 9 need not be disposed in a close-packed arrangement, and another portion may be formed between the units 9 and 9 that are adjacent.

In the present embodiment, the plurality of the units 9 are formed symmetrically in the width direction X as a whole. For example, in the present embodiment, three of the units 9 are arranged side by side in the front-to-rear direction at the center in the width direction X. Further, in plan view, the plurality of units 9 are arranged symmetrically in the width direction X with reference to a virtual line A1 extending in the front-to-rear direction through the center of the three units 9 in the width direction X. Note that, the arrangement of the units 9 is not limited to this structure, because the panel rigidity, the dent resistance and the mass do not depend on the direction of the units 9, there is no constraint on the direction of the units 9.

In the present embodiment, in the direction toward the right side from the aforementioned three units 9 arranged at the central position in the width direction X are provided, in the following order, four units 9 which are arranged side by side in the longitudinal direction Y, further three units 9 which are arranged side by side in the longitudinal direction Y, further two units 9 which are arranged side by side in the longitudinal direction Y, and further two units 9 which are arranged side by side in the longitudinal direction Y. Furthermore, similarly to the foregoing arrangement, in the direction toward the left side from the aforementioned three units 9 arranged at the central position in the width direction X are provided, in the following order, four units 9 which are arranged side by side in the longitudinal direction Y, further three units 9 which are arranged side by side in the longitudinal direction Y, further two units 9 which are arranged side by side in the longitudinal direction Y, and further two units 9 which are arranged side by side in the longitudinal direction Y.

Each of the units 9 has six of the sub-units 10 (10*a* to 10*f*). In the present embodiment, in each of the units 9, a front sub-unit 10*a* and a rear sub-unit 10*d* extend along the width direction X, respectively. Further, in each of the units 9, the remaining four sub-units 10 extend in a direction that inclines with respect to the longitudinal direction Y in plan view. The unit 9 that has a polygonal shape is formed by the plurality of sub-units 10 in this way.

As illustrated clearly in FIG. 5 to FIG. 7, each of the sub-units 10 (10*a* to 10*f*) has a flange 11, an inclined wall 12 continuous with the flange 11, and the bottom portion 13 that is continuous with the inclined wall 12 and is separated from the flange 11.

The flange 11 is adjacent to the outer panel 3, and in the sub-unit 10, the flange 11 is a portion arranged closest to the outer panel 3. The flange 11 is a strip-shaped portion. In a single unit 9, the flanges 11 of six of the sub-units 10*a* to 10*f* form a hexagonal flange as a whole. Note that, the flanges 11 of six of the sub-units 10*a* to 10*f* may, as a whole, form a flange having a polygonal shape other than a hexagon, and may form a substantially circular flange, or may form a flange having a substantially oval shape. Inner end parts 11*a* of six of the flanges 11 constitute an annular end part which is centered on the center of the annular unit 9 as a whole. In the present embodiment, the plurality of the flanges 11 in the plurality of the units 9 are disposed in a close-packed arrangement. The width (width at a cross section orthogonal to a longitudinal direction L of the sub-unit 10) of an upper face 11*b* of the flange 11 is the distance between the inner end part 11*a* and an outer end part 11*c* of the flange 11. In a cross section (cross section illustrated in FIG. 5) orthogonal to the longitudinal direction L of the sub-unit 10, the outer end part 11*c* is the intersection point between a virtual line V1 including the upper face 11*b* (rectilinear portion) of the flange 11 and a virtual line V2 including an intermediate portion (rectilinear portion) of an upper face 12*a* of the inclined wall 12. In a case where the flange 11 and the inclined wall 12 are connected in a curved shape as in the present embodiment, the outer end part 11*c* is a virtual end part. On the other hand, in a case where the flange 11 and the inclined wall 12 are connected in a linearly pointed shape, the outer end part 11*c* is the connecting point between the flange 11 and the inclined wall 12. In the flange 11, the width of the upper face 11*b* to which the joint 7 can be applied is preferably 2 mm or more from the viewpoint that a sufficient amount of the joint 7 can be provided.

In the cross section orthogonal to the longitudinal direction L of the sub-unit 10, an inner end part 13*a* of the bottom portion 13 is the intersection point between a virtual line V3 which is a tangential line to the apex of a lower side face 13*b* of the bottom portion 13, and the virtual line V2. In a case where the inclined wall 12 and the bottom portion 13 are connected in a curved shape as in the present embodiment, the inner end part 13a of the bottom portion 13 is a virtual portion. On the other hand, in a case where the inclined wall 12 and the bottom portion 13 are connected in a linearly pointed shape, the inner end part 13a of the bottom portion 13 is an actual portion.

Each of the two end parts of the flange 11 in the longitudinal direction L is formed in a curved shape in plan view, and smoothly connects with the flange 11 of an adjacent sub-unit 10. In the present embodiment, in each unit 9, the flanges 11 of at least some of the sub-units 10 are adhered to the joint 7 at the upper face 11b, and are adhered to the outer panel 3 through the joint 7. As illustrated in FIG. 5, the inclined wall 12 extends downward from the flange 11.

The inclined wall 12 is disposed between the flange 11 and the bottom portion 13, and connects the flange 11 and the bottom portion 13. The inclined wall 12 is provided over the entire area in the longitudinal direction L of the sub-unit 10 in which the inclined wall 12 in question is provided. The inclined wall 12 is formed, for example, in a tapered shape that advances toward the central axis side (the inner end part 11a side) of the unit 9 as it approaches the outer panel 3 side.

The flange 11 is continuous with the upper end of the inclined wall 12. The bottom portion 13 is continuous with the lower end of the inclined wall 12. In a cross section orthogonal to the longitudinal direction L of the sub-unit 10, the flange 11 and the inclined wall 12 are continuous with each other in a smoothly curving shape, and are connected in a form in which it is difficult for stress concentration to occur. Similarly, the bottom portion 13 and the inclined wall 12 are continuous with each other in a smoothly curving shape, and are connected in a form in which it is difficult for stress concentration to occur.

In the unit 9, the bottom portion 13 is a portion that is farthest from the outer panel 3. The bottom portion 13 is formed in a curved shape which is convex in the downward direction. The bottom portion 13 is provided over the entire area in the longitudinal direction L of the sub-unit 10 in which the inclined wall 12 in question is provided. In a cross section orthogonal to the longitudinal direction L of the sub-unit 10, the flange 11, the inclined wall 12, and the bottom portion 13 are arranged in that order from the inner side to the outer side in the radial direction of the unit 9. The front end 13c of the bottom portion 13 in one unit 9 is integral with the front end 13c of the bottom portion 13 in another unit 9 that is adjacent thereto. As clearly illustrated in FIG. 6, in a single unit 9, the bottom portions 13 of the sub-units 20 which are adjacent to each other are butted against each other and are directly continuous with each other. For example, in a single unit 9, the bottom portion 13 of the sub-unit 10a is butted against and directly continuous with the bottom portion 13 of each of the sub-units 10b and 10f. Further, the front ends 13c of the six bottom portions 13 of the six sub-units 10a to 10f form a unit boundary 14 having a hexagonal shape as a whole. Further, at the unit boundary 14, the bottom portions 13 of the adjacent units 9 and 9 are continuous with each other. By this means, the units 9 and 9 which are adjacent to each other have the sub-units 10 in which the bottom portions 13 are continuous with each other. For example, in the units 9 and 9 which are adjacent to each other, the bottom portion 13 of the sub-unit 10a of one of the units 9 and the bottom portion 13 of the sub-unit 10d of the other unit 9 are butted against each other and are directly continuous with each other.

Preferably, the maximum value of a distance D1 between the two flanges 11 and 11 of the two sub-units 10 and 10 in which the bottom portions 13 and 13 are arranged separated from each other and are adjacent to each other is set to 250 mm or less. The maximum value of the distance D1 is more preferably set to 170 mm or less.

The term "separated from each other" means that the portions in question do not directly contact each other. In a case where two bottom portions 13 and 13 are connected via another portion such as another bottom portion 13 or the like, they are said to be separated from each other. For example, in a single unit 9, although the bottom portion 13 of the sub-unit 10a and the bottom portion 13 of the sub-unit 10b are continuous with each other, since the bottom portion 13 of the sub-unit 10a and the bottom portion 13 of the sub-unit 10c are continuous through the bottom portion 13 of the sub-unit 10b, they are "separated from each other". Further, in units 9 and 9 which are adjacent, although the sub-unit 10a and the sub-unit 10d whose bottom portions 13 are directly connected to each other are continuous with each other, because the bottom portion 13 of the sub-unit 10a of one of the units 9 and the bottom portion 13 of the sub-unit 10e of the other unit 9 are not directly connected, the bottom portion 13 of the sub-unit 10a and the bottom portion 13 of the sub-unit 10e in question are separated from each other.

The term "adjacent" means that the relevant parts are directly adjacent to each other, and in a case where another portion is arranged between two sub-units 10 and 10, the two sub-units 10 and 10 in question are not said to be adjacent. For example, in a single unit 9, the sub-unit 10a faces all of the sub-units 10b to 10f without any other member being interposed therebetween, and can be said to be adjacent to the sub-units 10b to 10f. Further, in units 9 and 9 which are adjacent, it can be said that one sub-unit 10a of one of the units 9 and the sub-unit 10d which is closest to the one sub-unit 10 in question are adjacent. For example, in the case of units 9 and 9 that are adjacent, because the sub-unit 10d of another unit 9 is present between the sub-unit 10a of one of the units 9 and the sub-unit 10a of the other of the units 9, it cannot be said that the sub-unit 10a of the one of the units 9 and the sub-unit 10a of the other of the units 9 are adjacent.

In a single unit 9, the maximum value of the distance D1 between the flanges 11 and 11 of two of the sub-units 10 and 10 on opposite sides is preferably 250 mm or less, and more preferably is set to 170 mm or less. More specifically, the distance D1 between the flanges 11 and 11 of the sub-unit 10a and 10d, the distance D1 between the flanges 11 and 11 of the sub-unit 10b and 10e, and the distance D1 between the flanges 11 and 11 of the sub-unit 10c and 10f are each preferably 250 mm or less, and more preferably are each 170 mm or less.

Further, in two units 9 and 9 that are adjacent, a frame portion 15 having a hat-shaped cross section is formed by a pair of the sub-units 10 and 10 including a pair of the bottom portions 13 and 13 which are butted against each other and are directly continuous with each other. In the drawing, the frame portion 15 is surrounded by an oval dashed line. The frame portion 15 has, for example, the sub-unit 10a of one unit 9 and the sub-unit 10d of another unit 9. A plurality of the frame portions 15 are formed, and each frame portion 15 is formed by two different units 9 and 9. In the present embodiment, the frame portion 15 is formed by a pair of the sub-units 10 and 10 which are parallel to each other. The inner panel 2 has a configuration in which a plurality of the frame portions 15 are combined, with each frame portion 15 used as a single unit structure. Further, in the present embodiment, an intersection portion 16 is formed by a plurality of the frame portions 15 intersecting with each other. At the intersection portion 16, one of the frame portions 15, another of the frame portions 15, and a further other of the frame portions 15 intersect with each other. In the present embodiment, by disposing the polygonal units 9 in a close-packed arrangement, a plurality of the intersection portions 16 of a plurality of the frame portions 15 are provided, and the shapes of the respective intersection portions 16 are substantially the same. In this case, the term "substantially" means exhibiting the same properties with respect to panel rigidity and dent resistance. In the present embodiment, the longitudinal directions of the plurality of frame portions 15 are different from each other, and therefore the strength against a load from any direction that acts on the inner panel 2 on a plane orthogonal to the height direction Z is secured.

In the present embodiment, a distance D2 between the flanges 11 and 11 of two frame portions 15 and 15 which are arranged separated from each other and are adjacent is defined. The distance D2 is the distance between the flanges 11 and 11 at two of the frame portions 15 and 15 which, in plan view, are arranged separated from each other and are adjacent, and which are two of the frame portions 15 and 15 that face each other in a direction orthogonal to the longitudinal direction L of the flanges 11 and 11. In the present embodiment, the maximum value of the distance D2 is preferably 250 mm or less, and more preferably is 170 mm or less. Thus, the maximum value of the distance D2 between the flanges 11 and 11 of two of the frame portions 15 and 15 arranged as opposite sides to each other is preferably 250 mm or less, and more preferably is 170 mm or less.

By the maximum value of the distance D1 being 250 mm or less, the support span of the outer panel 3 that is supported by the inner panel 2 can be prevented from becoming too long, and as a result, the practical panel rigidity of the outer panel 3 can be secured while making the inner panel 2 lighter. Similarly, by the maximum value of the distance D2 being 250 mm or less, the support span of the outer panel 3 that is supported by the inner panel 2 can be prevented from becoming too long. As a result, the practical panel rigidity of the outer panel 3 can be secured while making the inner panel 2 lighter. When the maximum values of both of the distances D1 and D2 are 170 mm or less, it is possible to secure even higher panel rigidity.

The minimum value of the distance D1 is preferably 30 mm or more. By the minimum value of the distance D1 being 30 mm or more, deflection deformation of the outer panel 3 can be moderately tolerated, and as a result, practical dent resistance of the outer panel 3 that is supported by the inner panel 2 can be secured. Similarly, by the minimum value of the distance D2 being 30 mm or more, deflection deformation of the outer panel 3 can be moderately tolerated, and as a result, practical dent resistance can be secured.

In the present embodiment, the height of the sub-unit 10 in the height direction Z, that is, a height H of the unit 9, is the distance between the inner end part 13a of the bottom portion 13 and the outer end part 11c of the flange 11 in the height direction Z, in other words, the height from the bottom portion 13 to the flange 11. The height H is preferably 10 mm or more. By setting the height H to 10 mm or more, when a bending force acts that attempts to bend the inner panel 2, that is, when a bending force that deflects a part or all of the inner panel 2 in a bow shape acts, a second moment of area with respect to the bending force can be made higher. By this means, bending deformation of the inner panel 2 and the outer panel 3 that is joined to the inner panel 2 can be suppressed. The height H is preferably 13 mm or more.

Note that, as described above, the height H of the unit 9 is preferably 10 mm or more. On the other hand, as illustrated in FIG. 1 and FIG. 2, in the present embodiment, at least at one part of an outermost circumferential sub-unit 101 as the sub-unit 10 in the unit 9 that is adjacently arranged so as to be closest to the outer circumferential edge of the outer circumferential portion 4 of the inner panel 2, the height from the bottom portion 13 to the flange 11 is lower than the height H in the other sub-units 10. By making the height at the outermost circumferential sub-unit 101 lower than the height H in the other sub-units 10 in this manner, a shape change at a boundary portion between the outermost circumferential sub-unit 101 and the outer circumferential portion 4 of the inner panel 2 can be made smooth. As a result, the concentration of stress at the boundary portion in question can be suppressed, and unintended cracking of the inner panel 2 at the boundary portion can be more reliably suppressed. The difference between the height H of the sub-units 10 and the height of the outermost circumferential sub-unit 101 is appropriately set according to the shape of the outer circumferential portion 4 of the inner panel 2.

Next, the joint 7 will be specifically described while referring mainly to FIG. 5 and FIG. 8. In the present embodiment, the joint 7 is an adhesive. A mastic sealer (mastic adhesive) can be exemplified as the adhesive. A resin-based adhesive can be exemplified as the mastic sealer. The adhesive may have a property of being cured at normal temperature (for example, 20 degrees Celsius), or may have a property of being cured by undergoing a heating process or a drying process.

The joint 7 is provided so as to secure both panel rigidity and dent resistance while achieving a reduction in the weight of the automobile panel 1. The joint 7 is provided on at least one of the plurality of flanges 11 of the inner panel 2. Further, the joint 7 joins the flange 11 on which the joint 7 is provided and the undersurface 3a of the outer panel 3. Thus, by the flange 11 of the inner panel 2 that is a flange which projects to the outer panel 3 side being joined to the outer panel 3 through the joint 7, the rigidity of the inner panel 2 that supports the outer panel 3 can be made high.

More specifically, in the present embodiment, in each of the units 9, the joint 7 is provided in at least two of the sub-units 10 that are parallel to each other among the six sub-units 10a to 10f. Further, in the present embodiment, in each of the units 9, the joint 7 is provided in all of the six sub-units 10a to 10f. In the present embodiment, on the upper face 11b of the flange 11 of each sub-unit 10, the joint 7 is provided over the entire area in the longitudinal direction of the sub-unit 10, and the joints 7 provided on the sub-units 10 that are adjacent are integrated with each other. By this means, in the present embodiment, in each of the units 9, the joint 7 is a hexagonal shape. The length of the joint 7 in the longitudinal direction L is set as appropriate.

In the present embodiment, the joint 7 is provided in each of two of the frame portions 15 and 15 which are arranged separated from each other and are adjacent. A distance D3 between the joints 7 and 7 of these two frame portions 15 and 15 each including one of the joints 7 is defined. The distance D3 is the distance between the joints 7 and 7 at two of the frame portions 15 and 15 which, in plan view, are arranged separated from each other and are adjacent, and which are two of the frame portions 15 and 15 that have the flanges 11 and 11 on which the joints 7 and 7 are provided and are two frame portions 15 and 15 that face each other in a direction orthogonal to the longitudinal direction L of the flange 11. The maximum value of the distance D3 is preferably 250 mm or less, and more preferably is 170 mm or less.

By the maximum value of the distance D3 being 250 mm or less, the support span of the outer panel 3 that is supported by the inner panel 2 can be prevented from becoming too long. As a result, the practical panel rigidity of the outer panel 3 can be secured while making the inner panel 2 and the outer panel 3 lighter. When the maximum value of the distance D3 is 170 mm or less, it is possible to secure even higher panel rigidity.

The minimum value of the distance D3 is preferably 30 mm or more. By the minimum value of the distance D3 being 30 mm or more, deflection deformation of the outer panel 3 can be moderately tolerated, and as a result, practical dent resistance of the outer panel 3 that is supported by the inner panel 2 can be secured.

From the viewpoint of material cost and weight reduction of the automobile panel 1, the joint 7 is preferably used in the smallest possible amount. Therefore, the joint 7 need not be provided on the flange 11 of all the sub-units 10.

<First Modification of Arrangement of Joints>

Figure 9:
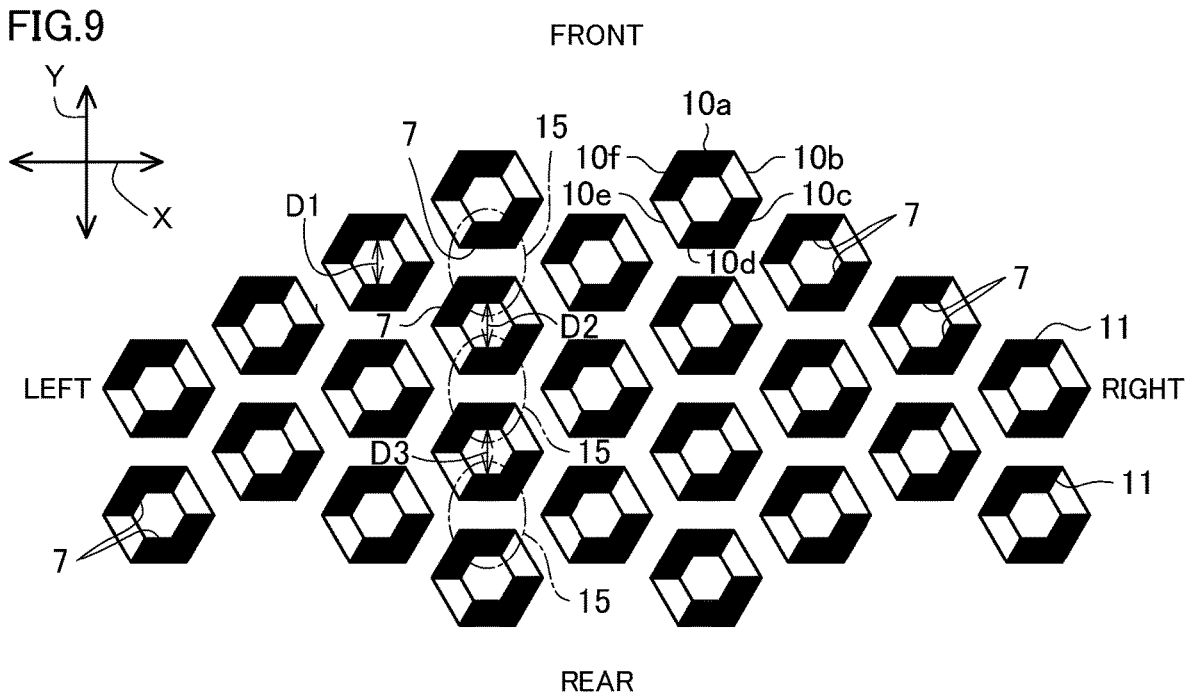
FIG. 9 is a conceptual plan view illustrating the principal part of a first modification of the arrangement of the joints, and shows locations at which the joints are provided.

FIG. 9 is a conceptual plan view illustrating the principal part of a first modification of the arrangement of the joints 7, and shows locations where the joints 7 are provided. As a first modification of the joint 7, the following configuration that is illustrated in FIG. 9 can be mentioned. That is, the joint 7 is provided in some of the sub-units 10 of the six sub-units 10 (10a to 10f) of each of the annular units 9. In this modification, among the six sub-units 10, the joint 7 is provided in at least two sub-units 10 that face each other in parallel and which are two sub-units 10 that are separated from each other. In this first modification, the joint 7 is provided in for example, the sub-units 10a, 10c, 10d and 10f among the six sub-units 10a to 10f. In each sub-unit 10 in which the joint 7 is provided, the joint 7 extends in a linear stripe along the longitudinal direction L of the sub-unit 10.

As described above, in the first modification, in each unit 9, the joint 7 is provided in some of the sub-units 10 among the six sub-units 10, and the joint 7 is not provided in the remaining sub-units 10. The whole area of each of the remaining sub-units 10 directly faces the outer panel 3 vertically.

In this configuration also, it is preferable that the joint 7 is provided in two of the frame portions 15 and 15 which are arranged separated from each other and which are adjacent to each other, and the maximum value of the distance D3 between the joints 7 between these two frame portions 15 and 15 is preferably 250 mm or less, and more preferably is 170 mm or less. Further, the minimum value of the distance D3 is preferably 30 mm or more.

In the first modification of the joints 7 described above, a form in which, in each unit 9, the joint 7 is provided in four of the sub-units 10, and the joint 7 is not provided in two of the sub-units 10 is described as an example. However, the joints 7 need not be arranged in this manner.

<Second Modification of Arrangement of Joints>

Figure 10:
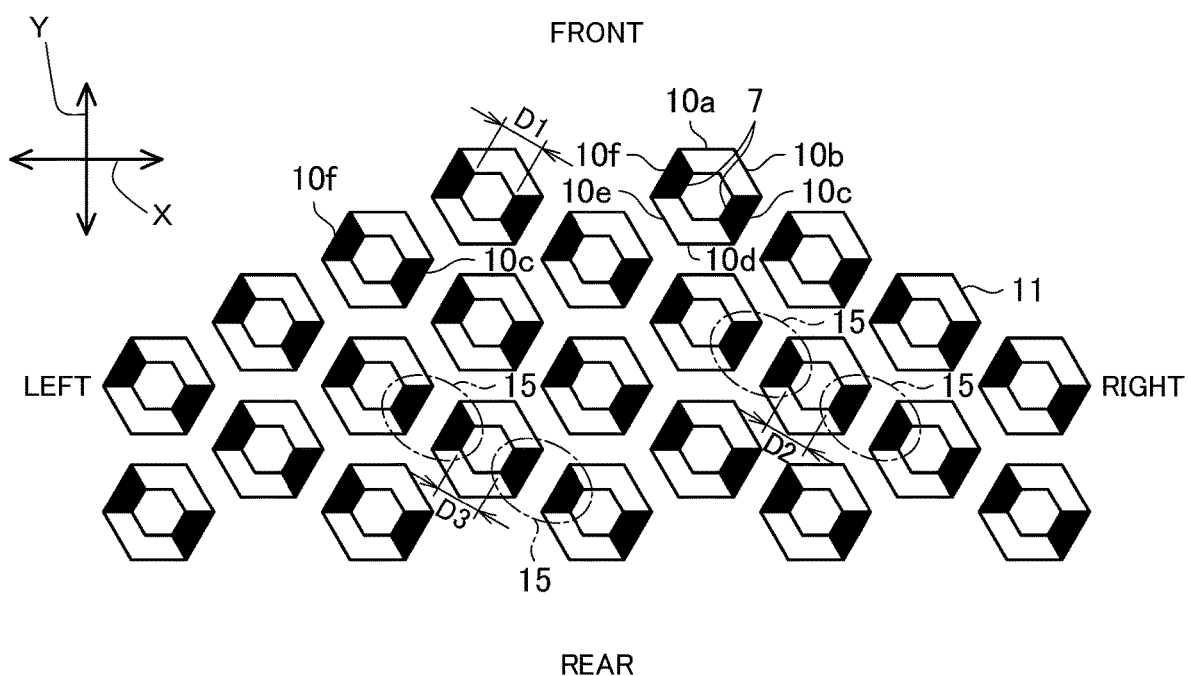
FIG. 10 is a conceptual plan view illustrating the principal part of a second modification of the arrangement of the joints, and shows locations at which the joints are provided.

For example, as shown in a second modification of the arrangement of the joints 7 illustrated in FIG. 10, in each unit 9, the joint 7 may be provided in only two of the sub-units 10 among the six sub-units 10. FIG. 10 is a conceptual plan view illustrating the principal part of the second modification of the arrangement of the joints 7, and shows locations where the joints 7 are provided. In this second modification, the two sub-units 10c and 10f that face each other in parallel in plan view are each provided with the joint 7. Further, the joint 7 is not provided in the remaining four sub-units 10, and therefore the remaining four sub-units 10 are directly adjacent to the outer panel 3.

In this configuration also, it is preferable that the joint 7 is provided in two of the frame portions 15 and 15 which are arranged separated from each other and which are adjacent to each other, and the maximum value of the distance D3 between the joints 7 and 7 between these two frame portions 15 and 15 is preferably 250 mm or less, and more preferably is 170 mm or less. Further, the minimum value of the distance D3 is preferably 30 mm or more.

Note that, in the above embodiment and each of the modifications of the arrangement of the joints 7, in each sub-unit 10 in which the joint 7 is provided, the joint 7 is not limited to a case in which the joint 7 is formed in a continuous linear shape on the flange 11. On one flange 11, the joint 7 may be provided at one point or may be intermittently arranged in a plurality of dot shapes. For example, in a single unit 9, the joint 7 may be provided in a dot shape only at the central portion of each flange 11 in the longitudinal direction L. Further, in a single unit 9, the joint 7 may be provided in a dot shape only at an end portion (corner portion of the unit 9) of each flange 11 in the longitudinal direction L.

As described above, according to the automobile panel 1, the panel rigidity of the outer panel 3 can be secured while achieving a reduction in the weight of the inner panel 2 and the outer panel 3. In addition, the dent resistance of the outer panel 3 can be made higher.

In particular, in the present embodiment, with respect to the frame portions 15 of the inner panel 2, the cross-sectional shape orthogonal to the longitudinal direction L of the flange 11 is a hat shape, and the frame portions 15 are configured so that a plurality of the frame portions 15 and 15 intersect at the intersection portion 16. The maximum values of the distances D1 and D2 between the flanges 11 and 11 and the distance D3 between the joints 7 and 7 are preferably set to 250 mm or less, respectively, and more preferably 170 mm or less. According to this configuration, with regard to constraint points as positions where the inner panel 2 constrains the outer panel 3 at the joints 7, a distance between the constraint points can be shortened. By this means, the rigidity with which the inner panel 2 supports the outer panel 3 can be further increased. By applying the stiffening structure provided by the frame portions 15 arranged at such narrow intervals, the degree to which the dent resistance depends on the sheet thickness of the outer panel 3 (sheet thickness dependence) can be reduced. Furthermore, by the minimum value of each of the distances D1, D2 and D3 being preferably 30 mm or more, it is possible to suppress a decrease in the dent resistance that is caused by the arrangement pitch of the flanges 11 and the joints 7 being too short. That is, by setting the maximum value of each of the distances D1, D2 and D3 to 250 mm or less, and more preferably 170 mm or less, and further setting the minimum value to 30 mm or more, a reduction in the panel rigidity and a reduction in the dent resistance that are caused by increasing the strength and thinning the walls can be suppressed. This finding has been discovered as the result of intensive research conducted by the inventors of the present application. Further, the automobile panel 1 can be made lighter in weight.

Further, according to the automobile panel 1 of the present embodiment, the sheet thickness t3 of the outer panel 3 of the steel sheet is 0.6 mm or less. In a case where the sheet thickness t3 of the outer panel 3 is 0.60 mm or less in this way, the panel rigidity and dent resistance obtained from the rigidity of the outer panel 3 itself decrease extremely in comparison to a case where the sheet thickness t3 of the outer panel 3 is 0.65 mm or more. More specifically, the panel rigidity of the outer panel 3 depends on the Young's modulus and the sheet thickness of the outer panel 3, and in particular, changes with the square of the sheet thickness. If the design sheet thickness of the outer panel 3 formed of a steel sheet is changed from 0.65 mm to 0.60 mm, the panel rigidity that the outer panel 3 can secure by itself is reduced extremely. This reduction in rigidity is particularly noticeable from the aspect of a sense of touch perceived when the outer panel 3 is pressed by a human hand, which is a factor that reduces the salability of the automobile. Thus, in relation to the panel rigidity of the outer panel 3 that is made of steel, a critical significance exists with respect to the sheet thickness t3 being between 0.60 mm and 0.65 mm. Further, even in a case where a thin outer panel 3 having a sheet thickness t3 of 0.60 mm or less is used as in the present embodiment, by combining the inner panel 2 and the outer panel 3 for reinforcement and stiffening, as the automobile panel 1, panel rigidity and dent resistance that are approximately equal to a case where the sheet thickness t3 of the outer panel 3 is 0.65 mm can be secured. Moreover, since the sheet thickness t3 of the outer panel 3 is reduced, a reduction in the weight of the automobile panel 1 can be achieved through the weight reduction of the outer panel 3. Note that, as described above, from the viewpoint of panel rigidity and dent resistance, an outer panel and an inner panel made of a steel sheet and an outer panel and an inner panel made of an aluminum alloy sheet can be set to thicknesses such that equivalent performance is obtained. Therefore, in the present embodiment, the outer panel and the inner panel may be steel sheets or may be aluminum alloy sheets.

An embodiment of the present invention as well as modifications of the arrangement of the joints 7 have been described above. However, the present invention is not limited to the above embodiment and modifications. In the present invention, various changes are possible within the scope of the accompanying claims. Note that, hereunder, configurations that are different from the above embodiment and modifications are mainly described, and components that are like in the above embodiment and modifications are denoted by like reference symbols and a detailed description thereof is omitted.

<First Modification of Unit>

Figure 11A:
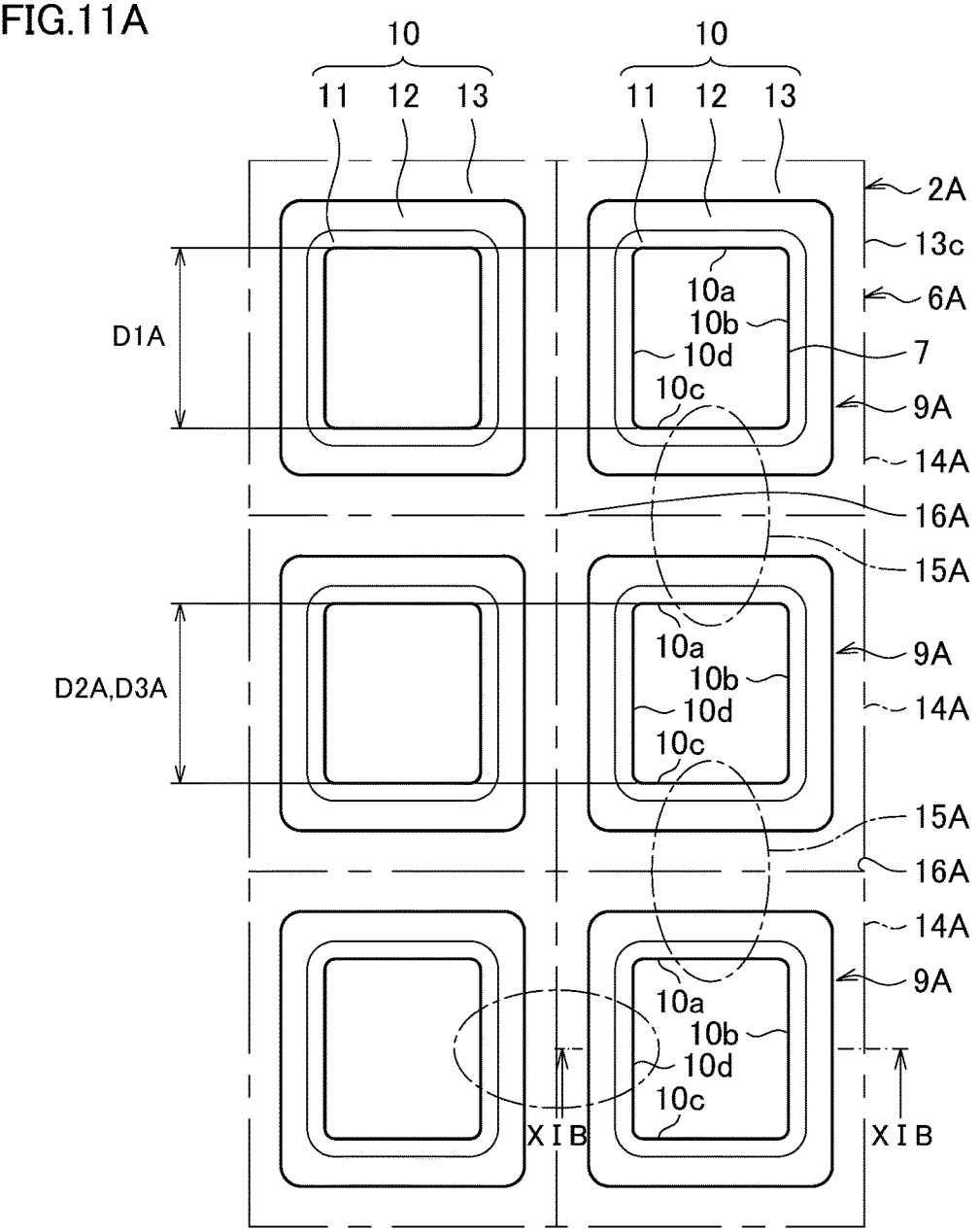
FIG. 11A is a view illustrating a first modification of a unit, which is a schematic plan view of a principal part.
Figure 11B:
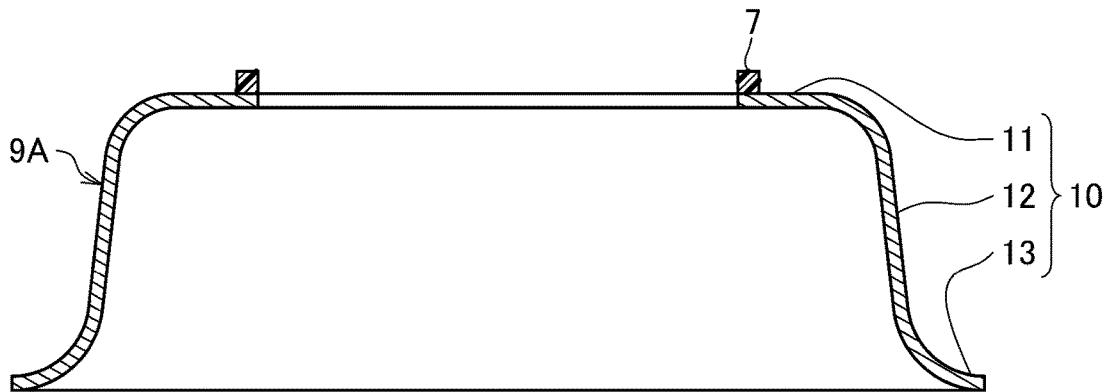
FIG. 11B is a view illustrating the first modification of a unit, which is a cross-sectional view along a line XIB-XIB in FIG. 11A.

In the above embodiment and modifications, the unit 9 is described using an example of the unit 9 that has a hexagonal shape. However, the unit need not have a hexagonal shape. For example, as illustrated in FIG. 11A and FIG. 11B, an overhanging structure 6A that includes a unit 9A formed in a quadrangular shape as a polygonal shape instead of the unit 9 may be provided. FIG. 11 is a multiple view drawing illustrating a first modification of the unit 9, in which FIG. 11A is a schematic plan view of a principal part, and FIG. 11B is a cross-sectional view along a line XIB-XIB in FIG. 11A. The overhanging structure 6A has a configuration in which the units 9A are disposed in a close-packed arrangement.

In the present first modification of the unit, each unit 9A is formed in a substantially rectangular shape with rounded corners. In the present description, the term "substantially rectangular shape" refers to a rectangular shape that can be treated as a rectangular shape from the viewpoint of panel rigidity and the viewpoint of dent resistance of the outer panel 3. Each unit 9A is formed in substantially the same shape. Note that in this case, the term "substantially the same" indicates that the configurations are the same except that the shape of each unit 9A is made to conform to a shape that is matched to the curved shape of the outer panel 3. Each unit 9A may be formed in a quadrangle other than a rectangle, such as a square. Note that, in the overhanging structure 6A, the units 9A need not be disposed in a close-packed arrangement, and another portion may be formed between the units 9A and 9A that are adjacent.

Each of the units 9A has four of the sub-units 10 (10a to 10d). In the present embodiment, in each unit 9A, the sub-unit 10a and the sub-unit 10c are arranged separated from each other and are adjacent to each other. Further, in each unit 9A, the sub-unit 10b and the sub-unit 10d are arranged separated from each other and are adjacent to each other.

Each of the sub-units 10 (10a to 10d) has the flange 11, the inclined wall 12 continuous with the flange 11, and the bottom portion 13 that is continuous with the inclined wall 12 and is separated from the flange 11.

In a single unit 9A, the front ends 13c of the bottom portions 13 of the four sub-units 10 form a single unit boundary 14A having a square shape as a whole. In the unit boundary 14A, the units 9A and 9A that are adjacent are continuous with each other.

In the present modification, the maximum value of a distance D1A between two of the flanges 11 and 11 of two of the sub-units 10 and 10 in which the bottom portions 13 and 13 are arranged separated from each other and are adjacent to each other is preferably 250 mm or less, and more preferably is 170 mm or less. In the present modification, in a single unit 9A, the distance between the flanges 11 and 11 of the sub-units 10a and 10c, and the distance between the flanges 11 and 11 of the sub-units 10b and 10d are each the distance D1A.

Further, in two units 9A and 9A that are adjacent, a frame portion 15A having a hat-shaped cross section is formed by a pair of the sub-units 10 and 10 including a pair of the bottom portions 13 and 13 which are butted against each other and are directly continuous with each other. A plurality of the frame portions 15A are formed, and each of the frame portions 15A is formed using two different units 9A and 9A. In the present embodiment, the frame portion 15A is formed by a pair of the sub-units 10 and 10 which are parallel to each other. It can also be said that the inner panel 2 has a configuration in which a plurality of the frame portions 15A are combined, with each frame portion 15A used as a single unit structure. Further, in the present modification, an intersection portion 16A is formed by four of the frame portions 15A intersecting so as to form a "+" shape as a whole.

In the present modification, a distance D2A between the flanges 11 and 11 of two of the frame portions 15A and 15A which are arranged separated from each other and are adjacent is defined. The distance D2A is the distance between the flanges 11 and 11 at two of the frame portions 15A and 15A which, in plan view, are arranged separated from each other and are adjacent, and which are two of the frame portions 15A and 15A that face each other in a direction orthogonal to the longitudinal direction L of the flanges 11 and 11. In the present modification, the maximum value of the distance D2A is preferably 250 mm or less, and more preferably is 170 mm or less. Thus, the maximum value of the distance D2A between the flanges 11 and 11 of two of the frame portions 15 and 15 arranged as opposite sides to each other is preferably 250 mm or less, and more preferably is 170 mm or less. Further, preferably the minimum value of the distance D1A and the distance D2A is 30 mm or more, respectively.

In the present modification, the joint 7 is provided in at least two of the sub-units 10 that are parallel to each other among the four sub-units 10. Further, in the present modification, in each of the units 9A, the joint 7 is provided in all of the four sub-units 10.

In the present modification, the joint 7 is provided in each of two of the frame portions 15A and 15A which are arranged separated from each other and are adjacent. Further, a distance D3A between the joints 7 and 7 of these two frame portions 15A and 15A each including one of the joints 7 is defined. The distance D3A is the distance between the joints 7 and 7 at two of the frame portions 15A and 15A which, in plan view, are arranged separated from each other and are adjacent, and which are two of the frame portions 15A and 15A that have the flange 11 on which the joint 7 is provided and are two frame portions 15A and 15A that face each other in a direction orthogonal to the longitudinal direction L of the flange 11. The maximum value of the distance D3A is preferably 250 mm or less, and more preferably is 170 mm or less. The minimum value of the distance D3A is preferably 30 mm or more.

Note that, in a single unit 9A, the joint 7 may be provided in only two of the sub-units 10 among the four sub-units 10.

In the present first modification relating to the unit also, similar operational advantages as the operational advantages described in relation to the above embodiment can be exhibited.

<Second Modification of Unit>

Figure 12A:
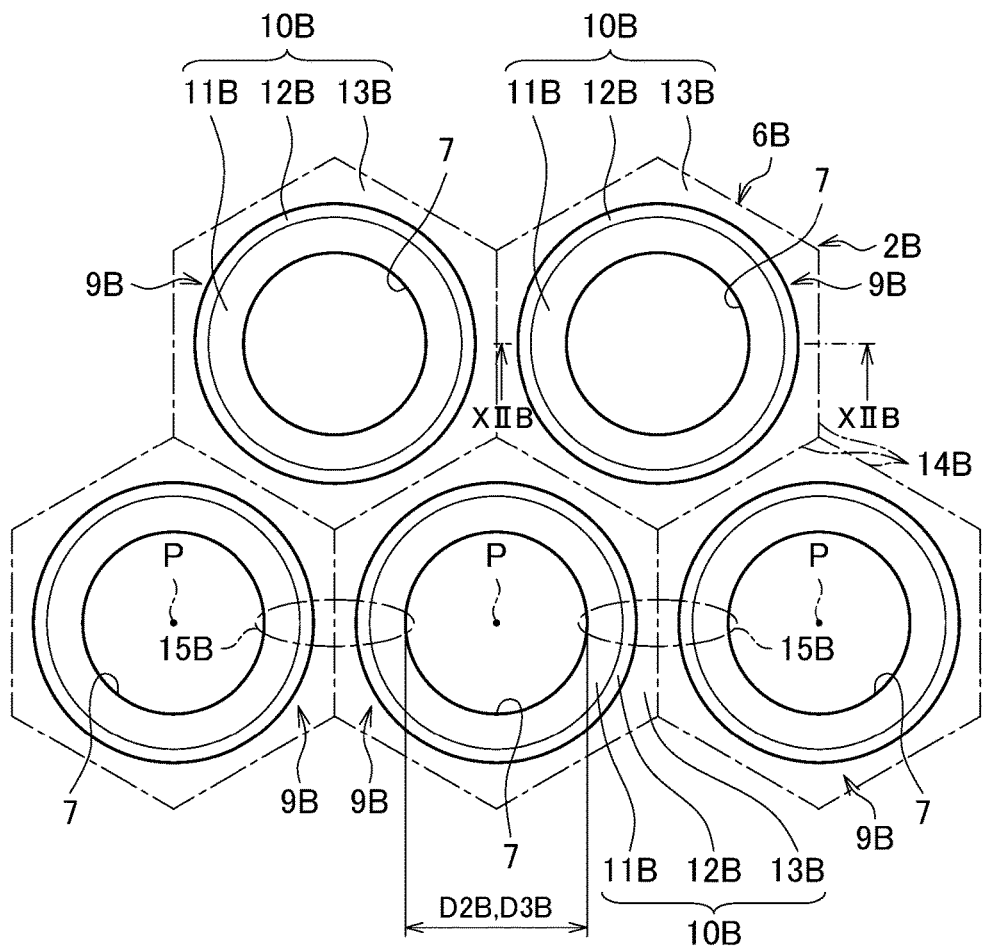
FIG. 12 is a view illustrating a second modification of a unit, which is a schematic plan view of a principal part.
FIG. 12B is a view illustrating the second modification of a unit, which is a cross-sectional view along a line XIIB-XIIB in FIG. 12A.
Figure 12B:
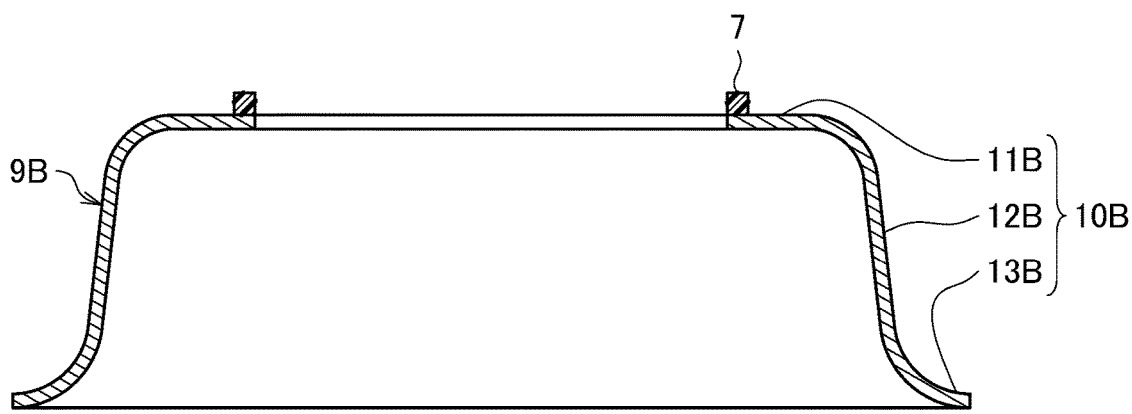

In the above embodiment and modifications, examples are described in which the shapes of the units 9 and 9A are polygonal shapes. However, the shape of the unit need not be a polygonal shape. For example, as illustrated in FIG. 12A and FIG. 12B, an overhanging structure 6B that includes a plurality of units 9B formed in a round shape by one sub-unit 10B instead of the units 9 or 9A may be provided. FIG. 12 is a multiple view drawing illustrating a second modification of the unit, in which FIG. 12A is a schematic plan view of a principal part, and FIG. 12B is a cross-sectional view along a line XIIB-XIIB in FIG. 12A. The overhanging structure 6B has a configuration in which the units 9B are disposed in a close-packed arrangement.

In the present second modification with respect to the unit, a plurality of the units 9B are disposed in a close-packed arrangement, with a hexagonal unit boundary 14B as a boundary of each unit 9B. Further, in each unit 9B, an inclined wall 12B is formed in a cylindrical shape or a hollow truncated cone shape, and a flange 11B is formed in a round shape. Note that, the inclined wall 12B and the flange 11B may be formed in an oval shape in plan view. Note that, in the overhanging structure 6B, the units 9B need not be disposed in a close-packed arrangement, and another portion may be formed between the units 9B and 9B that are adjacent.

Each unit 9B has one sub-unit 10B. The sub-unit 10B has the flange 11B, the inclined wall 12B continuous with the flange 11B, and a bottom portion 13B that is continuous with the inclined wall 12B and is separated from the flange 11B.

In two units 9B and 9B that are adjacent, a frame portion 15B having a hat-shaped cross section is formed by a pair of the sub-units 10B and 10B including a pair of the bottom portions 13B and 13B which are butted against each other and are directly continuous with each other. A region in which the frame portion 15B is formed and the circumference of the frame portion 15B are shown by an elliptic dashed line in FIG. 12A. The frame portion 15B is composed of portions of two units 9B at which the units 9B and 9B are most adjacent to each other. A plurality of the frame portions 15B are formed.

In the present modification, a distance D2B between the flanges 11B and 11B of two of the frame portions 15B and 15B which are arranged separated from each other and are adjacent is defined. The distance D2B is the distance, in plan view, between the flange 11B and 11B at two of the frame portion 15B and 15B which are arranged separated from each other and are adjacent, and is the distance in a direction in which a line segment between center points P, P and P of the units 9B, 9B and 9B to which these two frame portion 15B and 15B belong is oriented. In the present modification, the maximum value of the distance D2B is preferably 250 mm or less, and more preferably is 170 mm or less. The minimum value of the distance D2B is preferably 30 mm or more.

In the present modification, the joint 7 is provided on the flanges 11B and 11B on the frame portions 15B and 15B. A distance D3B between the joints 7 and 7 of these two frame portions 15B and 15B which respectively include one of the joints 7 and 7 is defined. In the present modification, the distance D3B is defined as being the same as the distance D2B. The maximum value of the distance D3B is preferably 250 mm or less, and more preferably is 170 mm or less. Further, the minimum value of the distance D3B is preferably 30 mm or more.

In the present second modification relating to the unit also, similar operational advantages as the operational advantages described in relation to the above embodiment can be exhibited.

Further, according to the present modification, the unit 9B having a round shape or an oval shape is formed by the sub-unit 10B. According to this configuration, the formability when forming the unit 9B from a blank serving as the starting material of the inner panel 2 can be increased. In particular, the workability when increasing the height (depth) of the unit 9B can be enhanced.

<Other Modifications>

In the above embodiment and modifications, it is described that the sheet thickness t3 of the outer panel 3 made of a steel sheet is preferably 0.6 mm or less. However, the sheet thickness t3 need not be 0.6 mm or less. It suffices that at least lightweight and high rigidity can be obtained for the inner panel 2, and the sheet thickness t3 of the outer panel 3 made of a steel sheet may be greater than 0.6 mm.

In the above embodiment and modifications, forms in which the inner panel 2 and the outer panel 3 are formed using steel sheets have been described as main examples. However, the inner panel 2 and the outer panel 3 need not be formed of steel sheets. The inner panel 2 and the outer panel 3 may be formed of a metal material such as an aluminum alloy or a magnesium alloy, or a resin material such as glass fiber or carbon fiber. Further, the inner panel 2 and the outer panel 3 may be formed of a composite material of a metal material and a resin material or the like.

Examples

Automobile hoods as automobile panels were manufactured. The panel rigidity, dent resistance and weight of each automobile panel were then measured. The automobile panel had a structure in which an inner panel formed using a steel sheet, and an outer panel formed using a steel sheet were joined by means of a mastic adhesive as a joint. Experimental conditions with respect to experiments conducted on the automobile panels are listed in Table 1.

TABLE 1

| Structure | Maximum Distance Between Frame Portions | Minimum Distance Between Frame Portions | Outer Panel | Inner Panel | Panel Rigidity | Dent Resistance | Weight | Remarks |
|---|---|---|---|---|---|---|---|---|
| Oversized Frame Type | 700 mm | 170 mm | 390 MPa-class 0.70 mm | 270 MPa-class 0.60 mm | excellent | excellent | poor | Comparative Example 1 |
| Oversized Frame Type | 700 mm | 170 mm | 340 MPa-class 0.65 mm | 270 MPa-class 0.60 mm | good | good | poor | Comparative Example 2 |
| Oversized Frame Type | 700 mm | 170 mm | 590 MPa-class 0.45 mm | 270 MPa-class 0.40 mm | poor | good | good | Comparative Example 3 |
| Undersized Frame Type | 170 mm | 25 mm | 590 MPa-class 0.45 mm | 270 MPa-class 0.40 mm | excellent | poor | good | Comparative Example 4 |
| Honeycomb | 300 mm | 300 mm | 590 MPa-class 0.45 mm | 270 MPa-class 0.40 mm | poor | good | good | Comparative Example 5 |
| Honeycomb | 140 mm | 140 mm | 590 MPa-class 0.45 mm | 270 MPa-class 0.40 mm | excellent | good | good | Inventive Example 1 of Present Invention |
| Honeycomb | 180 mm | 180 mm | 590 MPa-class 0.45 mm | 270 MPa-class 0.40 mm | good | good | good | Inventive Example 2 of Present Invention |
| Quadrangle | 190 mm | 190 mm | 590 MPa-class 0.45 mm | 270 MPa-class 0.40 mm | good | good | good | Inventive Example 3 of Present Invention |
| Quadrangle | 170 mm | 40 mm | 590 MPa-class 0.45 mm | 270 MPa-class 0.40 mm | excellent | good | good | Inventive Example 4 of Present Invention |
| Round | 200 mm | 200 mm | 590 MPa-class 0.45 mm | 270 MPa-class 0.40 mm | good | good | good | Inventive Example 5 of Present Invention |

The experimental conditions listed in Table 1 will now be described. In Table 1, the shape of the inner panel of the automobile panel as the measurement object is shown in the "Structure" column.

Figure 13A:
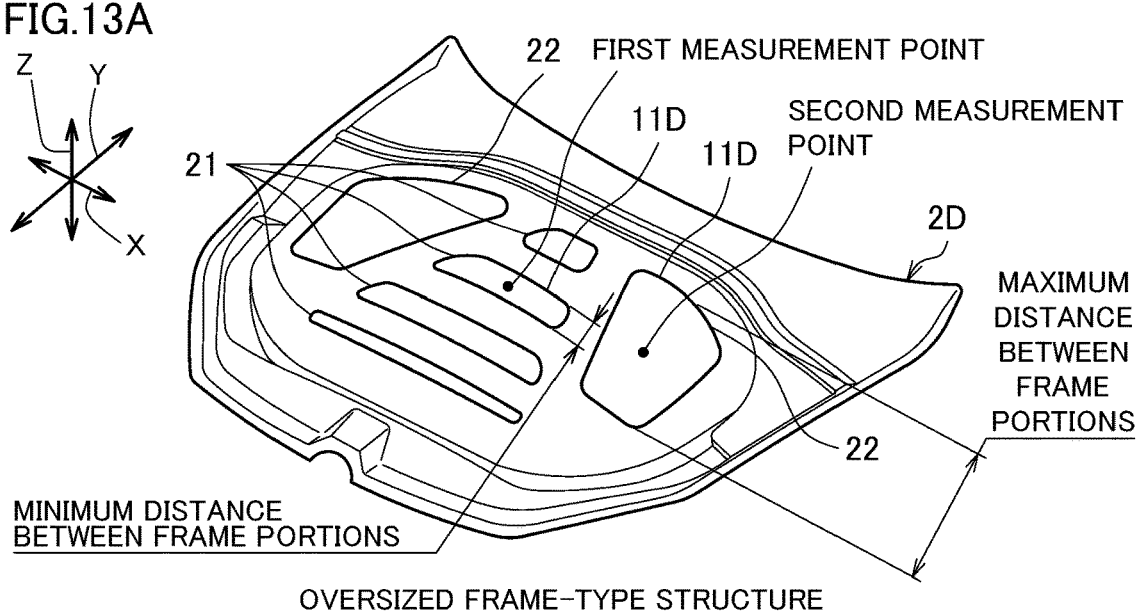
FIG. 13A is a schematic diagram illustrating an oversized frame-type structure of Table 1.

The "Oversized Frame Type" structure in the "Structure" column had an inner panel 2D illustrated in FIG. 13A. The inner panel 2D had a plurality of elongated units 21, and a pair of left and right large-sized units 22. Each elongated unit 21 was formed in a long and narrow shape in the width direction X. The elongated units 21 were arranged at the center in the width direction X of the inner panel 2D and were arranged in four along the longitudinal direction Y. The elongated unit 21 on the rear side in the longitudinal direction Y was formed in a shape that is close to a rectangular shape, and the elongated unit 21 on the front side in the longitudinal direction Y was formed so as to be longer in the width direction X and shorter in the longitudinal direction Y. In each elongated unit 21, a joint (not illustrated in FIG. 13A) was applied over the entire circumference of a flange 11D arranged at the upper end, and the elongated unit 21 and the outer panel 3 (not illustrated in FIG. 13A) were joined through this joint. The pair of left and right large-sized units 22 were arranged at the ends of the inner panel 2D in the width direction X. Each large-sized unit 22 was formed in a substantially trapezoidal shape. A flange 11D of the large-sized unit 22 was formed in an endless annular shape, and an opening area of a region surrounded by an inner circumferential edge portion of the flange 11D was made larger than an opening area of a region surrounded by an inner circumferential edge portion of the flange 11D of the respective elongated units 21. In each large-sized unit 22, a joint was applied over the entire circumference of the flange 11D arranged at the upper end, and the large-sized unit 22 and the outer panel 3 were joined through this joint.

Figure 13B:
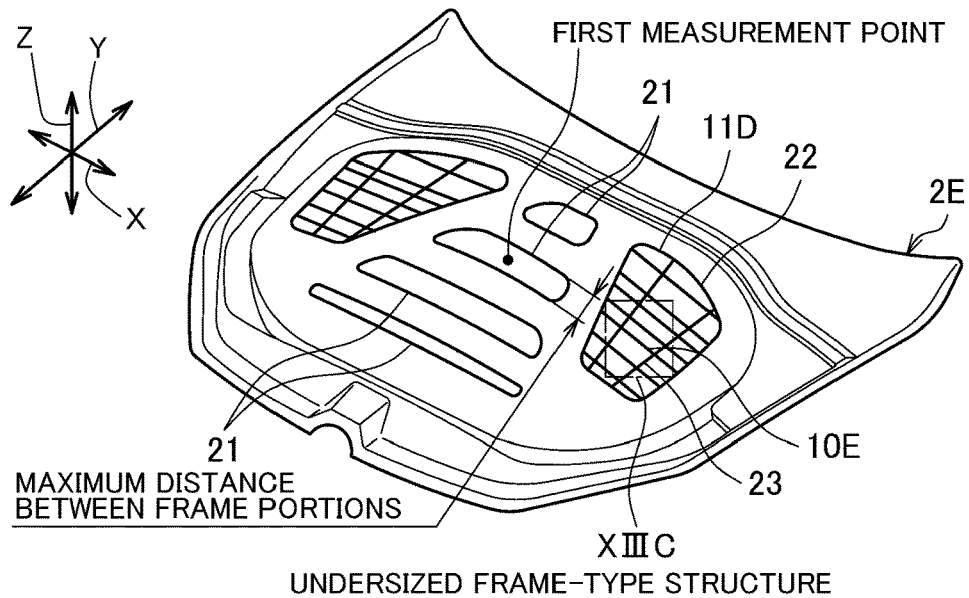
FIG. 13B is a schematic diagram illustrating an undersized frame-type structure of Table 1.
Figure 13C:
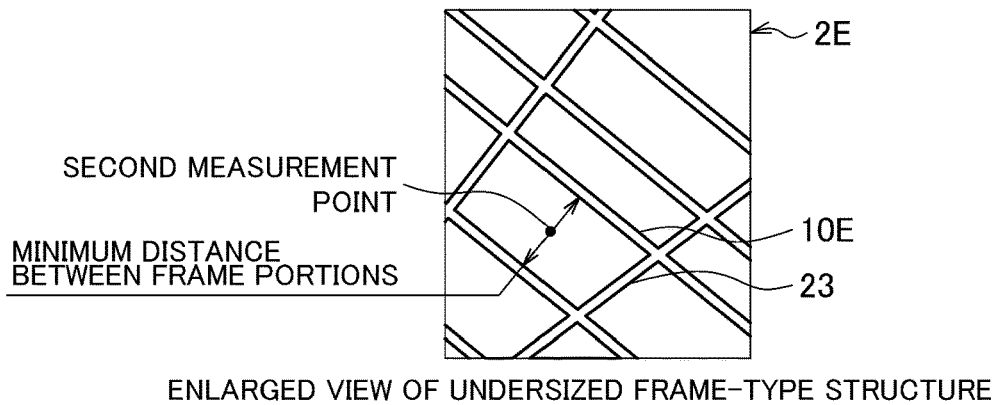
FIG. 13C is a view in which one part of the undersized frame-type structure is enlarged.

The "Undersized Frame Type" structure in the "Structure" column had an inner panel 2E that is illustrated in FIG. 13B and FIG. 13C. The inner panel 2E was configured to further include a small frame unit 23 in addition to the configuration of the inner panel 2D. Specifically, a plurality of sub-units 10E were provided in a grid pattern at an inner circumferential portion of each large-sized unit 22. The small frame unit 23 was formed by the plurality of sub-units 10E. The small frame unit 23 was arranged at substantially the center of an opening region surrounded by the inner circumferential edge portion of one of the large-sized units 22 in the width direction X. A joint was applied over the whole area of the upper face of the small frame unit 23, and the small frame unit 23 and the outer panel 3 were joined through this joint.

Figure 14A:
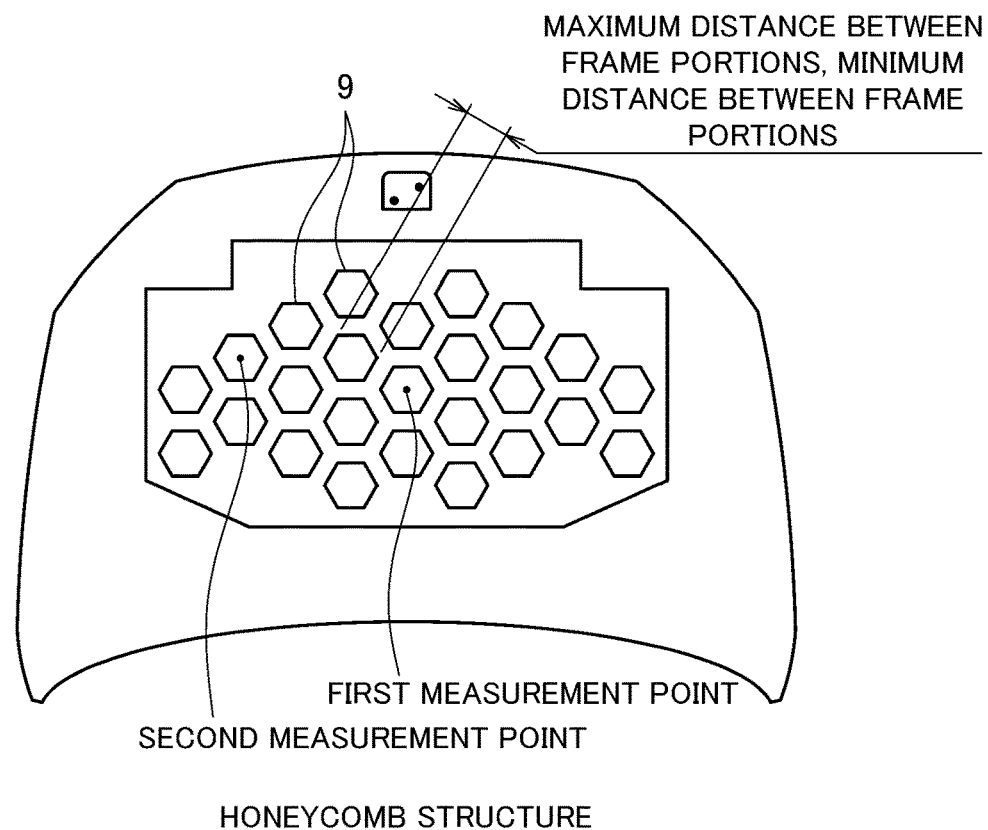
FIG. 14A is a schematic diagram illustrating a honeycomb structure of Table 1.
Figure 14B:
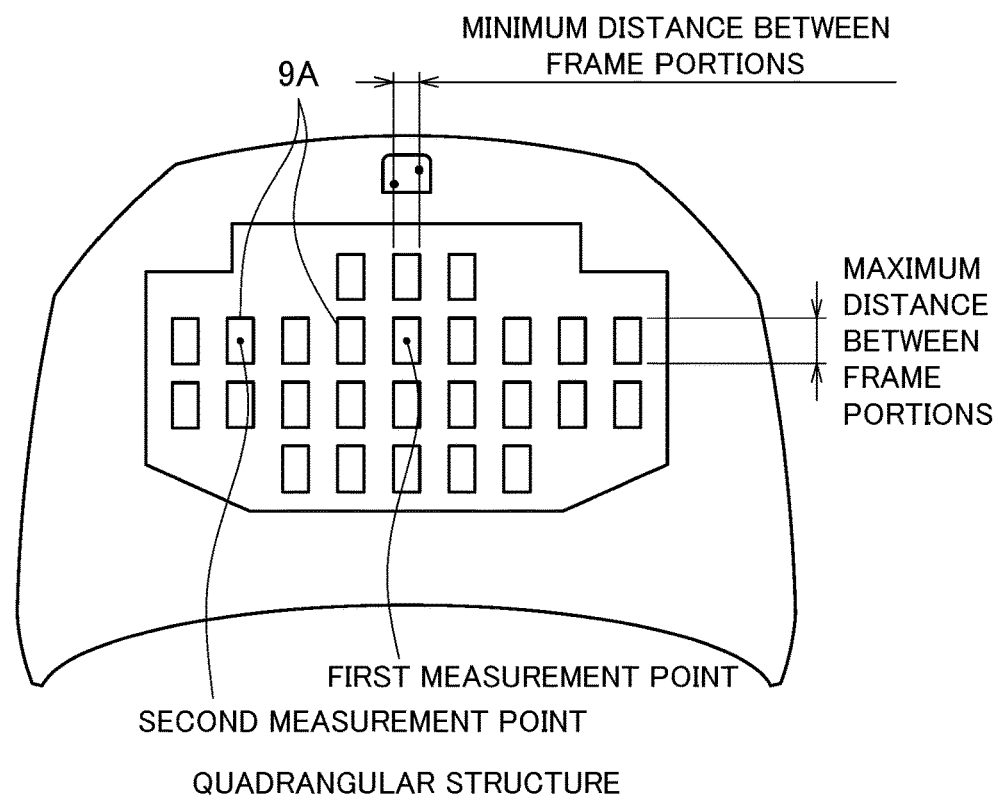
FIG. 14B is a schematic diagram illustrating a quadrangular structure of Table 1.
Figure 15:
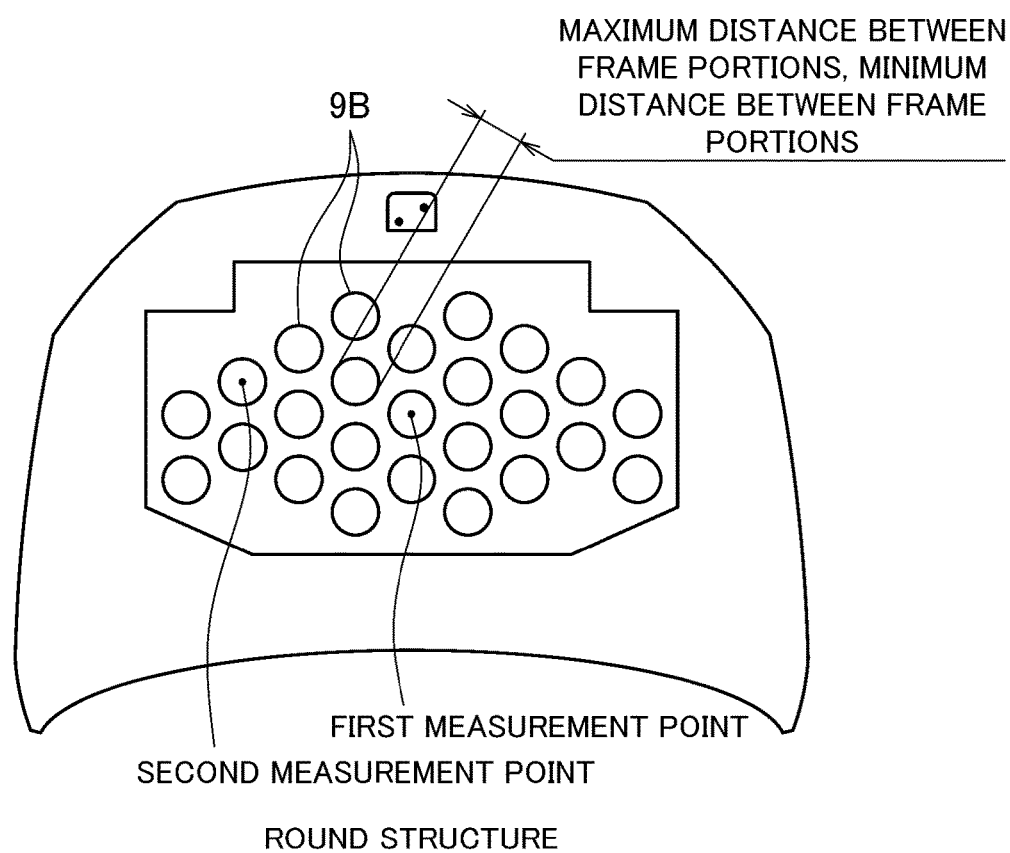
FIG. 15 is a schematic diagram illustrating a round structure of Table 1.

The "Honeycomb" structure in the "Structure" column had the same configuration as the inner panel 2 of the embodiment and, as illustrated in FIG. 14A, had a plurality of the hexagonal units 9. The inner panel was joined to the outer panel 3 by a joint. The "Quadrangle" structure in the "Structure" column had the same configuration as the inner panel 2A described in the first modification of the unit, and as illustrated in FIG. 14B, had a plurality of the units 9A having a quadrangular shape. The inner panel was joined to the outer panel 3 by a joint. The "Round" structure in the "Structure" column had the same configuration as the inner panel 2B described in the second modification of the unit, and as illustrated in FIG. 15, had the unit 9B which has a round shape.

The "Maximum Distance Between Frame Portions" column corresponds to the maximum value of the distances D1, D2 and D3 in the embodiment, and refers to the maximum value of the distance between the flanges of two frame portions which are arranged separated from each other and are adjacent. "Oversized Frame Type" in the "Maximum Distance Between Frame Portions" column refers to the distance between the flanges of two frame portions which are the furthest apart from each other in the large-sized unit 22 illustrated in FIG. 13A. "Undersized Frame Type" in the "Maximum Distance Between Frame Portions" column refers to the maximum distance between the flanges of two frame portions which are arranged separated from each other and are adjacent in the elongated unit 21 illustrated in FIG. 13B. "Honeycomb" in the "Maximum Distance Between Frame Portions" column refers to the distance between the flanges of two frame portions which are parallel to each other in the unit 9 illustrated in FIG. 14A. "Quadrangle" in the "Maximum Distance Between Frame Portions" column refers to the distance between the flanges of frame portions on the two short sides that are parallel to each other in the unit 9A illustrated in FIG. 14B. "Round" in the "Maximum Distance Between Frame Portions" column refers to the distance between the flanges of two frame portions which are adjacent to each other in the unit 9B illustrated in FIG. 15.

The "Minimum Distance Between Frame Portions" column corresponds to the minimum value of the distances D1, D2 and D3 in the embodiment, and refers to the minimum value of the distance between the flanges of two frame portions which are arranged separated from each other and are adjacent. "Oversized Frame Type" in the "Minimum Distance Between Frame Portions" column refers to the distance between the flanges of two frame portions which are separated from each other and are closest to each other in the elongated unit 21 which is second from the rear that is illustrated in FIG. 13A. "Undersized Frame Type" in the "Minimum Distance Between Frame Portions" column refers to the distance between the flanges of two frame portions which are separated from each other and are closest to each other in the small frame unit 23 illustrated in FIG. 13C. "Honeycomb" in the "Minimum Distance Between Frame Portions" column refers to the distance between the flanges of two frame portions that are parallel to each other in the unit 9 illustrated in FIG. 14A, and is the same value as the maximum distance between frame portions. "Quadrangle" in the "Minimum Distance Between Frame Portions" column refers to the distance between the flanges of the frame portions on the two long sides that are parallel to each other in the unit 9A illustrated in FIG. 14B. "Round" in the "Maximum Distance Between Frame Portions" column refers to the distance between flanges of the two frame portions that are adjacent to each other in the unit 9B illustrated in FIG. 15, and is the same value as the maximum distance between frame portions.

In the "Outer Panel" column, the tensile strength and sheet thickness of the outer panel are described for each structure. In the "Inner Panel" column, the tensile strength and sheet thickness of the inner panel are described for each structure.

In the "Panel Rigidity" column and "Dent Resistance" column, the results of evaluating Comparative Examples and Examples by evaluation methods described hereunder are shown.

<Panel Rigidity Evaluation Method>

Figure 16A:
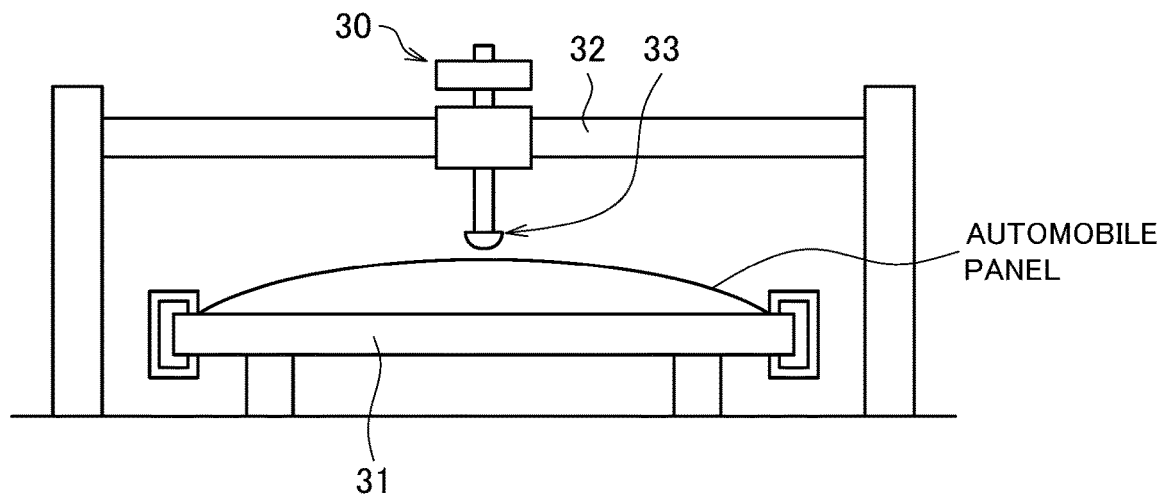
FIG. 16A is a schematic diagram illustrating a panel rigidity evaluation apparatus and an automobile panel.

FIG. 16A is a schematic diagram illustrating an evaluation apparatus 30 for evaluating panel rigidity, and an automobile panel. As illustrated in FIG. 16A, automobile panels of the Examples and Comparative Examples were evaluated using the evaluation apparatus 30. The evaluation apparatus 30 includes a clamp base 31 that clamps the outer circumferential edge of the automobile panel, a holder 32, and an indenter 33 that is attached to the holder 32. The indenter 33 is a steel member having a hemispherical shape with a radius of 50 mm, and faces the outer panel of the automobile panel that is mounted on the clamp base 31. With respect to the outer panel of the automobile panel, characteristic points at two locations were selected as evaluation points, with the first evaluation point being a point which is relatively close to a stiffened part produced by the inner panel, and the second evaluation point being a point which is relatively far from the stiffened part produced by the inner panel.

Regarding the "Oversized Frame Type" structure, as illustrated in FIG. 13A, the first measurement point is a point on the center (centroid) of an opening portion surrounded by the third elongated unit 21 from the front. The second measurement point is a point on the center (centroid) of an opening portion surrounded by the large-sized unit 22 on the right side in FIG. 13A.

Regarding the "Undersized Frame Type" structure, as illustrated in FIG. 13B, the first measurement point is a point on the center (centroid) of an opening portion surrounded by the third elongated unit 21 from the front. The second measurement point is a point on the center (centroid) of an opening portion surrounded by the small frame unit 23.

Regarding the "Honeycomb" structure, as illustrated in FIG. 14A, the first measurement point is a point on the center (centroid) of an opening portion surrounded by a unit 9 at the center of the inner panel. The second measurement point is a point on the center (centroid) of an opening portion surrounded by a unit 9 towards the left of the inner panel.

Regarding the "Quadrangle" structure, as illustrated in FIG. 14B, the first measurement point is a point on the center (centroid) of an opening portion surrounded by a unit 9A at the center of the inner panel. The second measurement point is a point on the center (centroid) of an opening portion surrounded by a unit 9A towards the left of the inner panel in FIG. 14B.

Regarding the "Round" structure, as illustrated in FIG. 15, the first measurement point is a point on the center (centroid) of an opening portion surrounded by a unit 9B at the center of the inner panel. The second measurement point is a point on the center (centroid) of an opening portion surrounded by a unit 9B towards the left of the inner panel.

The evaluation criterion for the panel rigidity was the deflection of the outer panel when a load of 98N was applied by the indenter 33 at the first measurement point and the second measurement point of the automobile panel, respectively, and the larger value among the deflection at the first measurement point and the deflection at the second measurement point was adopted as the evaluation object. If the deflection of the outer panel at the evaluation point which was measured with a dial gauge was less than 5.0 mm, the panel rigidity was evaluated as "excellent", if the deflection was 5.0 mm or more and less than 7.0 mm, the panel rigidity was evaluated as "good", while if the deflection was 7.0 mm or more the panel rigidity was evaluated as "poor".

The evaluation results for the panel rigidity are shown in Table 1.

<Dent Resistance Evaluation Method>

Figure 16B:
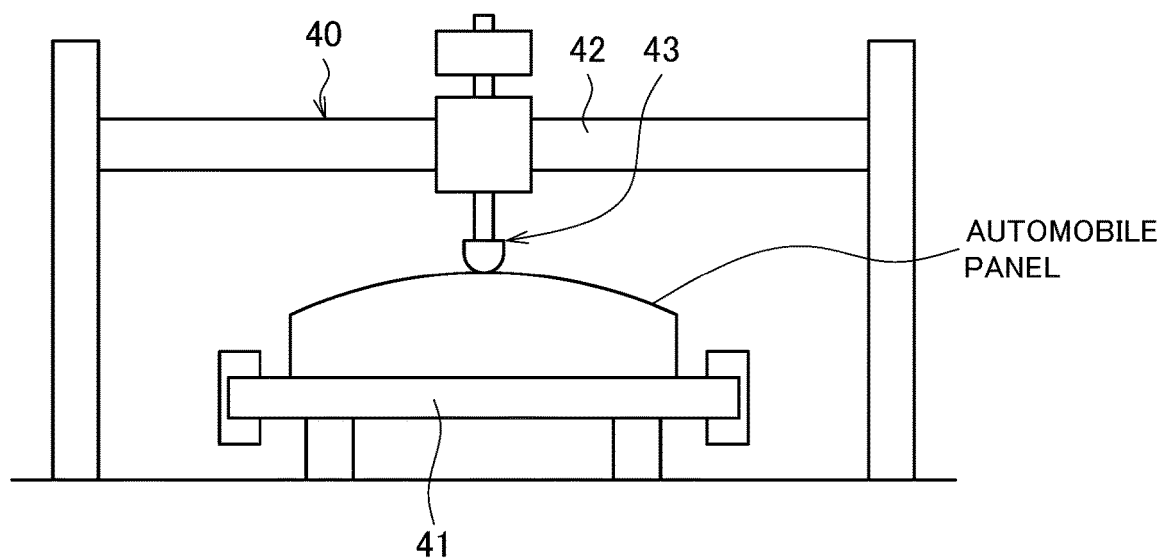
FIG. 16B is a schematic diagram illustrating a dent resistance evaluation apparatus and an automobile panel.

FIG. 16B is a schematic diagram of a dent resistance evaluation apparatus 40 and an automobile panel. As illustrated in FIG. 16B, the automobile panels of the Examples and Comparative Examples were evaluated using the evaluation apparatus 40. The evaluation apparatus 40 includes a clamp base 41 that clamps the automobile panel, a holder 42, and an indenter 43 that is attached to the holder 42. The indenter 43 is a steel member having a hemispherical shape with a radius of 25 mm, and faces the outer panel of the automobile panel that is mounted on the clamp base 41.

The evaluation criterion for the dent rigidity was a load when the indenter 43 made a dent mark having a depth of 0.1 mm at the aforementioned first measurement point and second measurement point of the automobile panel, and the larger value between the load at the first measurement point and the load at the second measurement point was adopted as the evaluation object. The load was 9.8 N to 19.6 N as one unit, and the load from the indenter 43 to each measurement point was increased stepwise for each unit load. A case where the load was 210 N or more was evaluated as "excellent", a case where the load was 180 N or more and less than 210 N was evaluated as "good", and a case where the load was less than 180 N was evaluated as "poor".

The evaluation results for the dent resistance are shown in Table 1.

<Weight Evaluation Method>

With respect to the automobile panel, a case where the combined weight of the outer panel and the inner panel was less than 10 kg was evaluated as good, and a case where the combined weight was 10 kg or more was evaluated as poor. The weight evaluation results are shown in Table 1.

As is clear from Table 1, in Comparative Examples 1 and 2, although the panel rigidity and the dent resistance were favorable because the sheet thickness of the outer panel was sufficiently secured, the evaluation for weight was poor because the sheet thickness of the outer panel was large. In Comparative Example 3, because the sheet thickness of the outer panel was 0.45 mm and the sheet thickness of the inner panel was 0.40 mm, the automobile panel was lightweight. However, as a result of the maximum distance between frame portions of the oversized frame type being significantly more than 250 mm, the panel rigidity was low and was evaluated as "poor". In Comparative Example 4, because the sheet thickness of the outer panel was 0.45 mm and the sheet thickness of the inner panel was 0.40 mm, the automobile panel was lightweight. However, because the minimum distance between frame portions was less than 30 mm, the deflection deformation tolerance of the outer panel when a load was applied with the indenter 43 was low, and the dent resistance was evaluated as "poor". In Comparative Example 5, because the sheet thickness of the outer panel was 0.45 mm and the sheet thickness of the inner panel was 0.40 mm, the automobile panel was lightweight. However, since the maximum distance between frame portions was significantly more than 250 mm, the panel rigidity was low and was evaluated as "poor".

On the other hand, for each of Inventive Examples 1 to 5 of the present invention, favorable results were obtained for all the evaluation items of panel rigidity, dent resistance and weight. That is, for each of Inventive Examples 1 to 5 of the present invention, the panel rigidity and the dent resistance were favorable while the respective automobile panels were also lightweight because the sheet thickness of the outer panel was 0.45 mm and the sheet thickness of the inner panel was 0.40 mm. In particular, as is clear when Comparative Example 5 and Inventive Example 5 of the present invention are compared, it was clarified that favorable panel rigidity is obtained by making the maximum distance between frame portions 250 mm or less. Further, as is clear when Comparative Example 4 and Inventive Example 4 of the present invention are compared, it was clarified that favorable dent resistance is obtained by making the minimum distance between frame portions 30 mm or more. Based on Inventive Examples 1 and 4 of the present invention, it was clarified that particularly excellent panel rigidity is obtained by making the maximum distance between frame portions 170 mm or less.

The results of the above evaluations show that, for example, panel rigidity and dent resistance similar to the panel rigidity and dent resistance of an outer panel made of a steel sheet having a tensile strength of 340 MPa and a sheet thickness of 0.65 mm could be obtained with an outer panel made of a DP (dual-phase) steel having a tensile strength of 590 MPa and a sheet thickness of 0.45 mm.

Note that, as described above, with respect to the outer panel 3 made of a steel sheet and the inner panel 2 made of a steel sheet, and the outer panel 3 made of an aluminum alloy sheet and the inner panel 2 made of an aluminum alloy sheet, by setting the respective sheet thicknesses of these panels to thicknesses such that the respective performances thereof from the viewpoint of panel rigidity and dent resistance are equivalent, similar panel rigidity and dent resistance can be secured. Therefore, it is clear that similar advantageous effects can also be obtained when the present invention is applied to an aluminum alloy sheet.

INDUSTRIAL APPLICABILITY

The present invention can be widely applied as an automobile inner panel and an automobile panel.

REFERENCE SIGNS LIST

2 Automobile Inner Panel
3 Automobile Outer Panel
7 Joint
9, 9A, 9B Unit
10, 10B Sub-unit
11, 11B Flange
12, 12B Inclined Wall
13, 13B Bottom Portion
15, 15A, 15B Frame Portion
D1, D1A Distance Between Flanges
D2, D2A, D2B Distance Between Flanges Between Frame Portions
D3, D3A, D3B Distance Between Joints of Two Frame Portions
H Height

The invention claimed is:

1. An automobile inner panel, comprising:
a plurality of sub-units each including a flange, an inclined wall continuous with the flange, and a bottom portion continuous with the inclined wall and separated from the flange,
wherein:
the bottom portions of the sub-units which are adjacent to each other are butted against each other and are directly continuous with each other;
a maximum value of a distance between two of the flanges of two of the sub-units in which the bottom portions are arranged separated from each other and which are adjacent to each other is 250 mm or less; and
at least at one part of an outermost circumferential sub-unit, which is the sub-unit arranged adjacent to an outer circumferential edge of the automobile inner panel, a height from the bottom portion to the flange is lower than a height from the bottom portion to the flange in another sub-unit.

2. The automobile inner panel according to claim 1, wherein:
a unit having a polygonal shape is formed by a plurality of the sub-units.

3. The automobile inner panel according to claim 1, wherein:
a unit having a round shape or an oval shape is formed by the sub-unit.

4. The automobile inner panel according to claim 2, wherein:
a plurality of the flanges in a plurality of the units are disposed in a close-packed arrangement.

5. The automobile inner panel according to claim 1, wherein:
the sub-unit having the height from the bottom portion to the flange of 10 mm or more is provided.

6. An automobile panel, comprising:
an automobile inner panel according to claim 1;
an automobile outer panel supported by the automobile inner panel; and
a joint,
wherein:
the joint is provided in at least one of a plurality of the flanges of the automobile inner panel; and
the joint joins the flange in which the joint is provided and the automobile outer panel.

7. The automobile panel according to claim 6, wherein:
a frame portion having a hat-shaped cross section is formed by a pair of the sub-units including a pair of the bottom portions which are butted against each other and are directly continuous with each other;
a plurality of the frame portions are provided;
the joints are provided in two of the frame portions which are arranged separated from each other and are adjacent; and
a minimum value of a distance between the joints of two of the frame portions is 30 mm or more.

8. The automobile panel according to claim 6, wherein:
the outer panel is a steel sheet; and
a sheet thickness of the outer panel is within a range of 0.35 mm to 0.60 mm.

9. The automobile panel according to claim 6, wherein:
the outer panel is an aluminum alloy sheet; and
a sheet thickness of the panel is within a range of 0.50 mm to 1.00 mm.

10. An automobile inner panel, comprising:
a plurality of sub-units each including a flange, an inclined wall continuous with the flange, and a bottom portion continuous with the inclined wall and separated from the flange,
wherein:
a frame portion having a hat-shaped cross section is formed by a pair of the sub-units including a pair of the bottom portions which are butted against each other and are directly continuous with each other;
a plurality of the frame portions are provided;
a maximum value of a distance between the flanges of two of the frame portions which are arranged separated from each other and are adjacent is 250 mm or less; and
at least at one part of an outermost circumferential sub-unit, which is the sub-unit arranged adjacent to an outer circumferential edge of the automobile inner panel, a height from the bottom portion to the flange is lower than a height from the bottom portion to the flange in another sub-unit.

11. The automobile inner panel according to claim 10, wherein:
a unit having a polygonal shape is formed by a plurality of the sub-units.

12. The automobile inner panel according to claim 10, wherein:
a unit having a round shape or an oval shape is formed by the sub-unit.

13. The automobile inner panel according to claim 11, wherein:
a plurality of the flanges in a plurality of the units are disposed in a close-packed arrangement.

14. The automobile inner panel according to claim 10, wherein:
the sub-unit having the height from the bottom portion to the flange of 10 mm or more is provided.

15. An automobile panel, comprising:
an automobile inner panel according to claim 10;
an automobile outer panel supported by the automobile inner panel; and
a joint,
wherein:
the joint is provided in at least one of a plurality of the flanges of the automobile inner panel; and
the joint joins the flange in which the joint is provided and the automobile outer panel.

16. The automobile panel according to claim 15, wherein:
the joints are provided in two of the frame portions which are arranged separated from each other and are adjacent; and
a minimum value of a distance between the joints of two of the frame portions is 30 mm or more.

17. The automobile panel according to claim 15, wherein:
the outer panel is a steel sheet; and
a sheet thickness of the outer panel is within a range of 0.35 mm to 0.60 mm.

18. The automobile panel according to claim 15, wherein:
the outer panel is an aluminum alloy sheet; and
a sheet thickness of the panel is within a range of 0.50 mm to 1.00 mm.

* * * * *